(12) United States Patent
Huang

(10) Patent No.: US 9,090,307 B2
(45) Date of Patent: *Jul. 28, 2015

(54) GRIP FOR THE HANDLE OF AN ARTICLE

(76) Inventor: Ben Huang, Huntington Beach, CA (US)

( * ) Notice: Subject to any disclaimer, the term of this patent is extended or adjusted under 35 U.S.C. 154(b) by 1319 days.

This patent is subject to a terminal disclaimer.

(21) Appl. No.: 12/753,804

(22) Filed: Apr. 2, 2010

(65) Prior Publication Data

US 2010/0269626 A1    Oct. 28, 2010

Related U.S. Application Data

(60) Provisional application No. 61/173,561, filed on Apr. 28, 2009, provisional application No. 61/183,478, filed on Jun. 2, 2009.

(51) Int. Cl.
| | | |
|---|---|---|
| *B62K 21/26* | (2006.01) | |
| *B32B 3/00* | (2006.01) | |
| *B32B 38/08* | (2006.01) | |
| *B29C 63/10* | (2006.01) | |
| *B32B 37/12* | (2006.01) | |
| *B32B 38/00* | (2006.01) | |

(52) U.S. Cl.
CPC .................. *B62K 21/26* (2013.01); *B32B 38/08* (2013.01); *B29C 63/10* (2013.01); *B32B 37/12* (2013.01); *B32B 38/105* (2013.01); *B32B 2305/20* (2013.01); *B32B 2375/00* (2013.01); *Y10T 16/466* (2015.01); *Y10T 74/20828* (2015.01); *Y10T 156/1038* (2015.01)

(58) Field of Classification Search
CPC .............. A63B 53/14; A63B 59/0029; A63B 59/0014; B62K 21/26; B25G 1/10; B25G 1/102
USPC ........... 74/551.1–551.9, 558; 156/307.3, 187; 473/300–303, 538, 568, 549; 16/421, 16/422; 428/172, 173, 88, 95, 151
See application file for complete search history.

(56) References Cited

U.S. PATENT DOCUMENTS

| | | |
|---|---|---|
| 450,906 A | 4/1891 | Blakely |
| 571,025 A | 11/1896 | Spamer |
| 834,711 A | 10/1906 | Clarke et al. |
| 979,266 A | 12/1910 | Dean |
| 1,008,604 A | 11/1911 | Lake |

(Continued)

FOREIGN PATENT DOCUMENTS

| | | |
|---|---|---|
| CN | 2090283 | 12/1991 |
| CN | 2109404 U | 7/1992 |

(Continued)

OTHER PUBLICATIONS

U.S. Appl. No. 13/208,297, filed Aug. 11, 2011, pending (207C2).

(Continued)

*Primary Examiner* — Daniel Yabut
(74) *Attorney, Agent, or Firm* — Knobbe, Martens, Olson & Bear, LLP

(57) ABSTRACT

Disclosed are grips and methods of making grips for use with the handle of an article, and in particular for use with bicycle handles. The grip preferably includes a multi-layered gripping member. The outer layer of the gripping member preferably includes a thin layer saturated by polyurethane. The outer layer of the gripping member can be attached to an inner base layer.

11 Claims, 14 Drawing Sheets

(56) References Cited

U.S. PATENT DOCUMENTS

| Patent No. | | Date | Inventor | Cite |
|---|---|---|---|---|
| 1,017,565 | A | 2/1912 | Lard | |
| 1,139,843 | A | 5/1915 | Brown | |
| 1,345,505 | A | 7/1920 | Persons | |
| 1,435,088 | A | 11/1922 | Smith | |
| 1,480,056 | A | 1/1924 | Flint | |
| 1,522,635 | A | 1/1924 | Kraeuter | |
| 1,528,190 | A | 3/1925 | Howe | |
| 1,617,972 | A | 2/1927 | Wallace | |
| 1,701,856 | A | 2/1929 | Kraeuter | |
| 1,890,037 | A | 11/1930 | Johnson | |
| 1,943,399 | A | 1/1934 | Smith | |
| 2,000,295 | A | 5/1935 | Oldham | |
| 2,010,627 | A | 8/1935 | Dileo | |
| 2,086,062 | A | 7/1937 | Bray | |
| 2,103,889 | A | 12/1937 | Brisick | |
| 2,115,119 | A | 4/1938 | Park | |
| 2,149,911 | A | 3/1939 | East | |
| 2,206,056 | A | 7/1940 | Sheesley | |
| 2,221,421 | A | 11/1940 | Curry | |
| 2,225,839 | A | 12/1940 | Moore | |
| 2,449,575 | A | 9/1948 | Wilhelm | |
| 2,523,637 | A | 9/1950 | Stanfield et al. | |
| 2,671,660 | A | 3/1954 | Goodwin | |
| 2,690,338 | A | 9/1954 | Brocke | |
| 2,772,090 | A | 11/1956 | Brandon | |
| 2,830,399 | A | 4/1958 | Davis | |
| 2,934,285 | A | 4/1960 | Niehaus | |
| 2,984,486 | A | 5/1961 | Jones | |
| 3,028,283 | A | 4/1962 | Lundgren et al. | |
| 3,059,816 | A | 10/1962 | Goldstein | |
| 3,073,055 | A | 1/1963 | Edwards et al. | |
| 3,087,729 | A | 4/1963 | Sullivan | |
| 3,095,198 | A | 6/1963 | Gasche | |
| 3,140,873 | A | 7/1964 | Goodwin | |
| 3,150,460 | A | 9/1964 | Dees | |
| 3,157,723 | A | 11/1964 | Hochberg | |
| 3,252,706 | A | 5/1966 | Rosasco, Sr. | |
| 3,266,966 | A * | 8/1966 | Patchell | 156/167 |
| 3,311,375 | A | 3/1967 | Onions | |
| 3,366,384 | A | 1/1968 | Lamkin et al. | |
| 3,368,811 | A | 2/1968 | Finney | |
| 3,503,784 | A | 3/1970 | Okayama et al. | |
| 3,606,325 | A | 9/1971 | Lamkin et al. | |
| 3,697,315 | A | 10/1972 | Mine | |
| 3,848,480 | A * | 11/1974 | Oseroff et al. | 74/558.5 |
| 3,857,745 | A | 12/1974 | Grausch et al. | |
| 3,876,320 | A | 4/1975 | Phillipson | |
| 3,922,402 | A | 11/1975 | Shimamura et al. | |
| 3,964,340 | A | 6/1976 | Antonio et al. | |
| 3,973,348 | A | 8/1976 | Shell | |
| 3,992,021 | A | 11/1976 | Tobin | |
| 4,012,039 | A | 3/1977 | Yerke | |
| 4,015,851 | A | 4/1977 | Pennell | |
| 4,052,061 | A | 10/1977 | Stewart | |
| 4,133,529 | A | 1/1979 | Gambino | |
| 4,137,360 | A | 1/1979 | Reischl | |
| 4,216,251 | A | 8/1980 | Nishimura et al. | |
| 4,284,275 | A | 8/1981 | Fletcher | |
| 4,347,280 | A | 8/1982 | Lau et al. | |
| 4,358,499 | A | 11/1982 | Hill | |
| 4,373,718 | A | 2/1983 | Schmidt | |
| 4,448,922 | A | 5/1984 | McCartney | |
| 4,453,332 | A | 6/1984 | Wightman | |
| 4,524,484 | A | 6/1985 | Graham | |
| 4,535,649 | A | 8/1985 | Stahel | |
| 4,582,459 | A | 4/1986 | Benit | |
| 4,613,537 | A | 9/1986 | Krüpper | |
| 4,651,991 | A | 3/1987 | McDuff | |
| 4,662,415 | A | 5/1987 | Proutt | |
| 4,765,856 | A | 8/1988 | Doubt | |
| 4,878,667 | A | 11/1989 | Tosti | |
| 4,919,420 | A | 4/1990 | Sato | |
| 4,941,232 | A | 7/1990 | Decker et al. | |
| 4,971,837 | A | 11/1990 | Martz et al. | |
| 5,024,866 | A | 6/1991 | Goode | |
| 5,055,340 | A * | 10/1991 | Matsumura et al. | 428/172 |
| 5,118,107 | A | 6/1992 | Bucher | |
| 5,123,646 | A | 6/1992 | Overby et al. | |
| 5,127,650 | A | 7/1992 | Schneller | |
| 5,145,210 | A * | 9/1992 | Lennon | 74/551.1 |
| 5,220,707 | A | 6/1993 | Newman, Sr. et al. | |
| 5,261,665 | A | 11/1993 | Downey | |
| 5,322,290 | A | 6/1994 | Minami | |
| 5,343,776 | A | 9/1994 | Falco | |
| 5,374,059 | A | 12/1994 | Huang | |
| 5,396,727 | A | 3/1995 | Furuya et al. | |
| 5,427,376 | A | 6/1995 | Cummings et al. | |
| 5,469,601 | A | 11/1995 | Jackson | |
| 5,474,802 | A | 12/1995 | Shimoda et al. | |
| 5,480,146 | A | 1/1996 | Comer | |
| 5,485,996 | A | 1/1996 | Niksich | |
| 5,511,445 | A | 4/1996 | Hildebrandt | |
| 5,535,539 | A | 7/1996 | Vetre | |
| 5,537,773 | A | 7/1996 | Matsubara et al. | |
| 5,570,884 | A | 11/1996 | Carps | |
| 5,571,050 | A | 11/1996 | Huang | |
| 5,577,722 | A | 11/1996 | Glassberg | |
| 5,584,482 | A * | 12/1996 | Huang | 473/301 |
| 5,595,544 | A | 1/1997 | Roelke | |
| 5,607,745 | A * | 3/1997 | Ogden | 428/138 |
| 5,611,533 | A | 3/1997 | Williams | |
| 5,624,116 | A | 4/1997 | Yeh | |
| 5,626,527 | A | 5/1997 | Eberlein | |
| 5,634,859 | A | 6/1997 | Nesbitt | |
| 5,645,501 | A | 7/1997 | Huang | |
| 5,671,923 | A | 9/1997 | Huang | |
| 5,690,566 | A | 11/1997 | Bracho | |
| 5,695,418 | A | 12/1997 | Huang | |
| 5,730,662 | A | 3/1998 | Rens | |
| 5,730,669 | A | 3/1998 | Huang | |
| 5,743,577 | A | 4/1998 | Newman, Jr. et al. | |
| 5,753,568 | A | 5/1998 | Shimano et al. | |
| 5,766,720 | A | 6/1998 | Yamagishi et al. | |
| 5,772,524 | A | 6/1998 | Huang | |
| 5,781,963 | A | 7/1998 | Maru et al. | |
| 5,797,813 | A | 8/1998 | Huang | |
| 5,803,828 | A | 9/1998 | Huang | |
| 5,813,921 | A | 9/1998 | Huang | |
| 5,816,933 | A | 10/1998 | Huang | |
| 5,816,934 | A | 10/1998 | Huang | |
| 5,827,129 | A | 10/1998 | Huang | |
| 5,839,983 | A | 11/1998 | Kramer | |
| 5,851,632 | A | 12/1998 | Chen et al. | |
| 5,857,929 | A | 1/1999 | Huang | |
| 5,867,868 | A | 2/1999 | Ward | |
| 5,890,260 | A | 4/1999 | Gaunt | |
| 5,890,313 | A | 4/1999 | Collins | |
| 5,890,972 | A | 4/1999 | Huang | |
| 5,895,329 | A | 4/1999 | Huang | |
| 5,910,054 | A | 6/1999 | Huang | |
| 5,924,941 | A | 7/1999 | Hagey | |
| 5,997,421 | A | 12/1999 | Huang | |
| 6,036,607 | A | 3/2000 | Finegan | |
| 6,048,275 | A | 4/2000 | Gedeon | |
| 6,148,482 | A | 11/2000 | Maraman, Jr. | |
| 6,197,392 | B1 | 3/2001 | Jones | |
| 6,226,836 | B1 | 5/2001 | Yasui | |
| 6,244,975 | B1 | 6/2001 | Huang | |
| 6,261,191 | B1 | 7/2001 | Chen | |
| 6,314,617 | B1 | 11/2001 | Hastings | |
| 6,360,475 | B1 | 3/2002 | Lepage et al. | |
| 6,361,450 | B1 | 3/2002 | Huang | |
| 6,386,989 | B1 | 5/2002 | Huang | |
| D463,520 | S | 9/2002 | Ulrich | |
| 6,449,803 | B1 | 9/2002 | McConchie | |
| 6,503,153 | B2 | 1/2003 | Wang | |
| 6,506,128 | B1 | 1/2003 | Bloom, Jr. | |
| 6,511,732 | B1 | 1/2003 | Chao | |
| 6,551,198 | B2 | 4/2003 | Huang | |
| 6,558,270 | B2 | 5/2003 | Kwitek | |
| 6,610,382 | B1 | 8/2003 | Kobe et al. | |
| 6,627,027 | B2 | 9/2003 | Huang | |
| 6,629,382 | B2 | 10/2003 | Irrgang et al. | |
| 6,629,901 | B2 | 10/2003 | Huang | |

(56) References Cited

U.S. PATENT DOCUMENTS

| | | |
|---|---|---|
| 6,635,688 B2 | 10/2003 | Simpson |
| 6,652,398 B2 | 11/2003 | Falone et al. |
| 6,656,054 B2 | 12/2003 | Ulrich |
| 6,656,057 B2 | 12/2003 | Manual et al. |
| 6,663,500 B2 * | 12/2003 | Huang ............ 473/300 |
| 6,666,777 B1 | 12/2003 | Lamkin et al. |
| 6,676,534 B2 | 1/2004 | Huang |
| 6,695,713 B2 | 2/2004 | Huang |
| 6,709,346 B1 | 3/2004 | Wang |
| 6,733,401 B1 | 5/2004 | Huang |
| 6,762,243 B2 | 7/2004 | Stender et al. |
| 6,827,656 B1 | 12/2004 | Hoeflich et al. |
| 6,843,732 B1 | 1/2005 | Huang |
| 6,846,759 B1 | 1/2005 | Copperwheat |
| 6,855,651 B2 | 2/2005 | Yu |
| 6,857,971 B2 | 2/2005 | Huang |
| 6,904,615 B2 | 6/2005 | Kobe et al. |
| 6,908,400 B2 | 6/2005 | Chu et al. |
| 6,973,750 B1 | 12/2005 | Kim |
| 6,974,626 B2 | 12/2005 | Horacek |
| 7,008,582 B2 | 3/2006 | Chen |
| 7,025,690 B2 | 4/2006 | Nam |
| 7,048,644 B2 | 5/2006 | Wang |
| 7,137,904 B2 | 11/2006 | Huang |
| 7,140,973 B2 | 11/2006 | Rohrer |
| D534,602 S | 1/2007 | Norton et al. |
| D534,603 S | 1/2007 | Norton et al. |
| D534,604 S | 1/2007 | Norton et al. |
| D534,605 S | 1/2007 | Norton et al. |
| D534,607 S | 1/2007 | Norton et al. |
| D534,975 S | 1/2007 | Norton et al. |
| D536,048 S | 1/2007 | Chen |
| D538,868 S | 3/2007 | Norton et al. |
| D538,869 S | 3/2007 | Wang et al. |
| 7,186,189 B2 | 3/2007 | Huang |
| 7,195,568 B2 | 3/2007 | Huang |
| 7,219,395 B2 | 5/2007 | Bigolin |
| 7,344,447 B2 | 3/2008 | Chang |
| 7,344,448 B2 | 3/2008 | Huang |
| 7,347,792 B2 | 3/2008 | Huang |
| 7,374,498 B2 | 5/2008 | Huang |
| 7,404,770 B2 | 7/2008 | Huang |
| 7,438,646 B2 | 10/2008 | Huang |
| 7,448,957 B2 | 11/2008 | Huang |
| 7,448,958 B2 | 11/2008 | Huang |
| 7,458,903 B2 | 12/2008 | Wang et al. |
| 7,470,199 B2 | 12/2008 | Huang |
| 7,491,133 B2 | 2/2009 | Huang |
| 7,527,564 B2 | 5/2009 | Huang |
| 7,566,375 B2 | 7/2009 | Huang |
| 7,585,230 B2 | 9/2009 | Huang |
| 7,749,094 B2 | 7/2010 | Chen |
| 7,770,321 B2 | 8/2010 | Huang |
| 2001/0046905 A1 * | 11/2001 | Huang ............ 473/300 |
| 2002/0028325 A1 | 3/2002 | Simpson |
| 2002/0142858 A1 | 10/2002 | Chen |
| 2002/0142900 A1 | 10/2002 | Wang |
| 2002/0151373 A1 | 10/2002 | Beauregard |
| 2002/0173371 A1 | 11/2002 | Lamkin et al. |
| 2003/0040384 A1 | 2/2003 | Falone et al. |
| 2003/0045370 A1 | 3/2003 | Jaw |
| 2003/0062654 A1 | 4/2003 | Lamkin |
| 2003/0139223 A1 | 7/2003 | Ulrich et al. |
| 2003/0148836 A1 | 8/2003 | Falone et al. |
| 2003/0150081 A1 | 8/2003 | Wang |
| 2003/0198803 A1 * | 10/2003 | Huang ............ 428/332 |
| 2003/0216192 A1 | 11/2003 | Chu |
| 2003/0228818 A1 * | 12/2003 | Vito et al. ............ 442/169 |
| 2003/0228930 A1 | 12/2003 | Huang |
| 2004/0029645 A1 | 2/2004 | Chen |
| 2004/0029646 A1 | 2/2004 | Chu et al. |
| 2004/0031128 A1 | 2/2004 | Chen |
| 2004/0109980 A1 | 6/2004 | Chen et al. |
| 2004/0123429 A1 | 7/2004 | Wang |
| 2004/0185958 A1 | 9/2004 | Huang |
| 2004/0248664 A1 | 12/2004 | Billings |
| 2005/0123723 A1 * | 6/2005 | Wang ............ 428/140 |
| 2005/0229285 A1 | 10/2005 | Chung |
| 2005/0276925 A1 | 12/2005 | Su |
| 2005/0287329 A1 | 12/2005 | Lai |
| 2006/0172815 A1 | 8/2006 | Chu |
| 2006/0188681 A1 | 8/2006 | Wang |
| 2006/0252571 A1 | 11/2006 | Wang |
| 2006/0287123 A1 | 12/2006 | Wang |
| 2007/0149307 A1 | 6/2007 | Huang |
| 2008/0014412 A1 | 1/2008 | Hortnagl et al. |
| 2008/0039226 A1 | 2/2008 | Chi |
| 2008/0040890 A1 | 2/2008 | Chang |
| 2008/0120893 A1 | 5/2008 | Keys et al. |
| 2008/0172839 A1 | 7/2008 | Wang |
| 2009/0035543 A1 * | 2/2009 | Vito et al. ............ 428/212 |
| 2010/0192722 A1 * | 8/2010 | Shiu et al. ............ 74/594.7 |

FOREIGN PATENT DOCUMENTS

| | | |
|---|---|---|
| CN | 2139008 Y | 7/1993 |
| CN | 2163667 Y | 5/1994 |
| CN | 2288744 | 8/1998 |
| CN | 1332022 A | 7/2000 |
| CN | 2438768 | 7/2001 |
| CN | 2444645 | 8/2001 |
| CN | ZL 02254450X | 9/2002 |
| CN | 2544761 | 4/2003 |
| CN | 2566903 Y | 8/2003 |
| CN | 2596752 Y | 1/2004 |
| CN | 2659497 Y | 12/2004 |
| DE | 36 44 674 A1 | 7/1988 |
| DE | 92 18 550 U1 | 8/1994 |
| EP | 1 435 256 | 1/2003 |
| FR | 2 731 402 A3 | 9/1996 |
| GB | 2 192 550 A | 1/1988 |
| JP | S57-111689 | 12/1955 |
| JP | 53-12061 | 2/1978 |
| JP | 55-43008 | 3/1980 |
| JP | 60-61067 | 4/1985 |
| JP | 3112575 | 5/1991 |
| JP | H04-077250 | 3/1992 |
| JP | 7-41731 | 2/1995 |
| JP | H09-056850 | 3/1997 |
| JP | H09-275858 | 10/1997 |
| JP | 3061769 | 6/1999 |
| JP | 3076015 | 12/2000 |
| JP | 3081404 | 8/2001 |
| JP | 2002-028264 | 1/2002 |
| JP | 2002-119180 | 4/2002 |
| JP | 2008-017711 | 1/2008 |
| TW | 194957 | 1/1992 |
| TW | M321797 | 11/2007 |
| TW | M350370 | 2/2009 |

OTHER PUBLICATIONS

A. Zosel, Adhession and tack of polymers: Influence of mechanical properties and surface tension, Colloid & Polymer Science 263:541-553 (1985) in 13 pages.

U.S. Appl. No. 13/403,764, filed Feb. 23, 2012, pending.

Design U.S. Appl. No. 29/416,672, filed Mar. 26, 2012, pending.

U.S. Appl. No. 13/526,323, filed Jun. 18, 2012, pending.

Design U.S. Appl. No. 29/436,610, filed Nov. 7, 2012, pending.

European Search Report 10250738 dated Dec. 28, 2010.

The Random House College Dictionary, Revised Edition, 1975, p. 1233, definition of skive.

U.S. Appl. No. 10/167,216, filed Jun. 11, 2002, now U.S. Patent No. 7,137,904, issued Nov. 21, 2006.

U.S. Appl. No. 10/348,389, filed Jan. 21, 2003, now U.S. Patent No. 6,733,401, issued May 11, 2004.

U.S. Appl. No. 10/392,480, filed Mar. 18, 2003, now U.S. Patent No. 6,857,971, issued Feb. 22, 2005.

U.S. Appl. No. 10/746,764, filed Dec. 23, 2003, now U.S. Patent No. 6,843,732, issued Jan. 18, 2005.

U.S. Appl. No. 10/608,598, filed Jun. 27, 2003, (U.S. Pub. No. 2004-0266546 Al), abandoned.

(56) References Cited

OTHER PUBLICATIONS

U.S. Appl. No. 10/785,379, filed Feb. 24, 2004, now U.S. Patent No. 7,374,498, issued May 20, 2008.
U.S. Appl. No. 10/827,095, filed Apr. 19, 2004, now U.S. Patent No. 7,195,568, issued Mar. 27, 2007.
U.S. Appl. No. 10/875,035, filed Jun. 23, 2004, now U.S. Patent No. 7,585,230, issued Sep. 8, 2009.
U.S. Appl. No. 11/029,328, filed Jan. 5, 2005, (U.S. Pub. No. 2005-0148401 A1), abandoned.
U.S. Appl. No. 11/062,046, filed Feb. 18, 2005, now U.S. Patent No. 7,470,199, issued Dec. 30, 2008.
U.S. Appl. No. 11/131,832, filed May 18, 2005, now U.S. Patent No. 7,527,564, issued May 5, 2009.
U.S. Appl. No. 11/172,770, filed Jul. 1, 2005, now U.S. Patent No. 7,186,189, issued Mar. 6, 2007.
U.S. Appl. No. 11/412,196, filed Apr. 25, 2006, (U.S. Pub. No. 2006-0264268 A1), abandoned.
U.S. Appl. No. 11/416,364, filed May 1, 2006, now U.S. Patent No. 7,438,646, issued Oct. 21, 2008.
U.S. Appl. No. 12/425,187, filed Apr. 16, 2009, (U.S. Pub. No. 2009-0258722 A1), abandoned.
U.S. Appl. No. 11/413,411, filed Apr. 28, 2006, now U.S. Patent No. 7,344,448, issued Mar. 18, 2008.
U.S. Appl. No. 11/438,808, filed May 22, 2006, now U.S. Patent No. 7,347,792, issued Mar. 25, 2008.
U.S. Appl. No. 11/417,643, filed May 3, 2006, now U.S. Patent No. 7,448,957, issued Nov. 11, 2008.
U.S. Appl. No. 11/417,623, filed May 3, 2006, now U.S. Patent No. 7,566,375, issued Jul. 28, 2009.
U.S. Appl. No. 11/417,555, filed May 3, 2006, now U.S. Patent No. 7,404,770, issued Jul. 29, 2008.
U.S. Appl. No. 11/417,401, filed May 3, 2006, now U.S. Patent No. 7,491,133, issued Feb. 17, 2009.
U.S. Appl. No. 11/682,264, filed Mar. 5, 2007, (U.S. Pub. No. 2007-0149307 A1), pending.
U.S. Appl. No. 11/417,696, filed Mar. 5, 2006, now U.S. Patent No. 7,448,958, issued Nov. 11, 2008.
U.S. Appl. No. 12/045,639, filed Mar. 10, 2008, (U.S. Pub. No. 2008-0229646 A1), pending.
U.S. Appl. No. 11/689,452, filed Mar. 21, 2007, (U.S. Pub. No. 2008-0230174 A1), pending.
U.S. Appl. No. 12/123,384, filed May 19, 2008, (U.S. Pub. No. 2008-0283178 A1), pending.
U.S. Appl. No. 11/838,670, filed Aug. 14, 2007, (U.S. Pub. No. 2009-0048036 A1), pending.
U.S. Appl. No. 12/055,289, filed Mar. 25, 2008, (U.S. Pub. No. 2009-0025852 A1), pending.
U.S. Appl. No. 12/426,896, filed Apr. 20, 2009, (U.S. Pub. No. 2009-0258721 A1), pending.
U.S. Appl. No. 12/753,799, filed Apr. 2, 2010, pending.
U.S. Appl. No. 12/511,033, filed Jul. 28, 2009, pending.
U.S. Appl. No. 12/753,669, filed Apr. 2, 2010, pending.
U.S. Appl. No. 12/753,773, filed Apr. 2, 2010, pending.
U.S. Appl. No. 12/767,736, filed Apr. 26, 2010, pending.
U.S. Appl. No. 12/848,052, filed Jul. 30, 2010, pending.
U.S. Appl. No. 12/862,673, filed Aug. 24, 2010, pending.
U.S. Appl. No. 12/948,637, filed Nov. 17, 2010, pending.
U.S. Appl. No. 12/960,261, filed Dec. 3, 2010, pending.
U.S. Appl. No. 13/750,853, filed Jan. 25, 2013, pending.
U.S. Appl. No. 13/866,911, filed Apr. 19, 2013, pending.
U.S. Appl. No. 13/874,889, filed May 1, 2013, pending.
U.S. Appl. No. 13/916,519, filed Jun. 12, 2013, pending.
U.S. Appl. No. 13/931,647, filed Jun. 28, 2013, pending.
U.S. Appl. No. 13/958,211, filed Aug. 2, 2013, pending.
U.S. Appl. No. 13/972,751, filed Aug. 21, 2013, pending.
U.S. Appl. No. 14/137,735, filed Dec. 20, 2013, pending.

\* cited by examiner

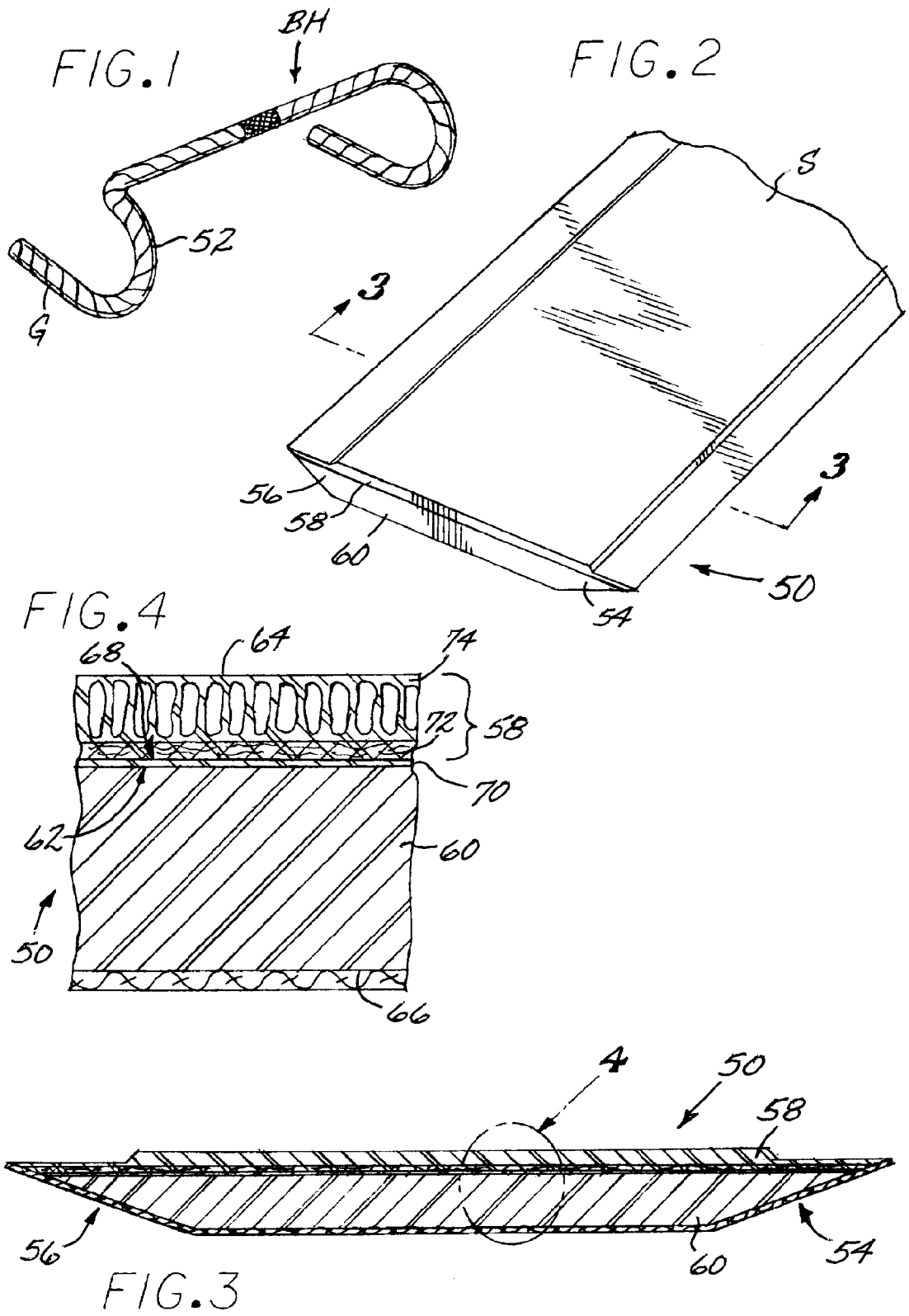

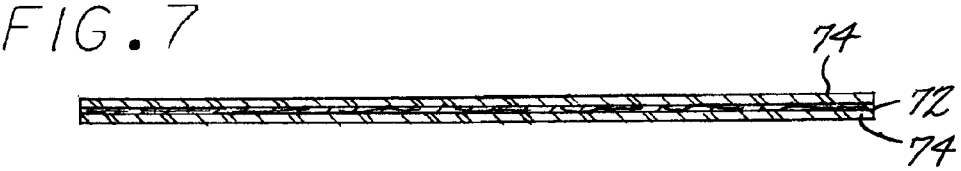
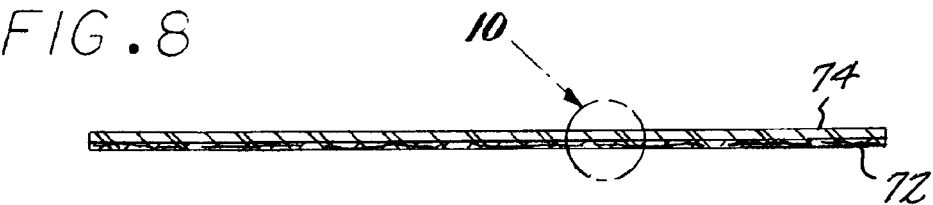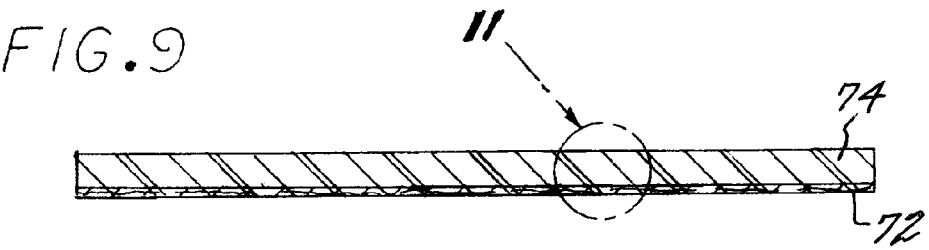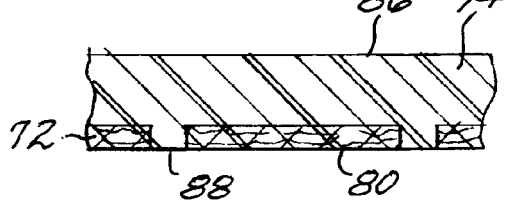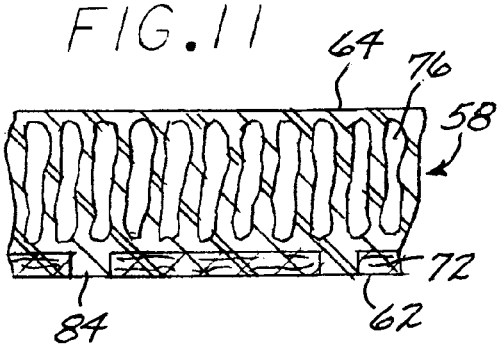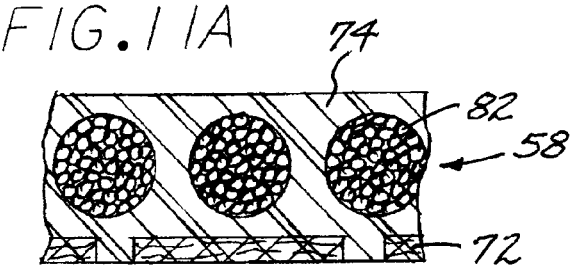

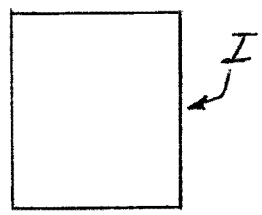
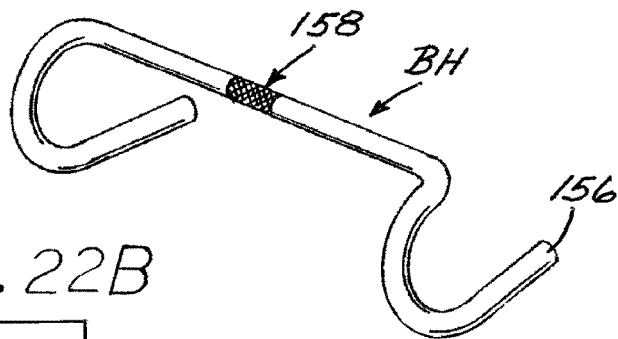
FIG.22A
FIG.22B
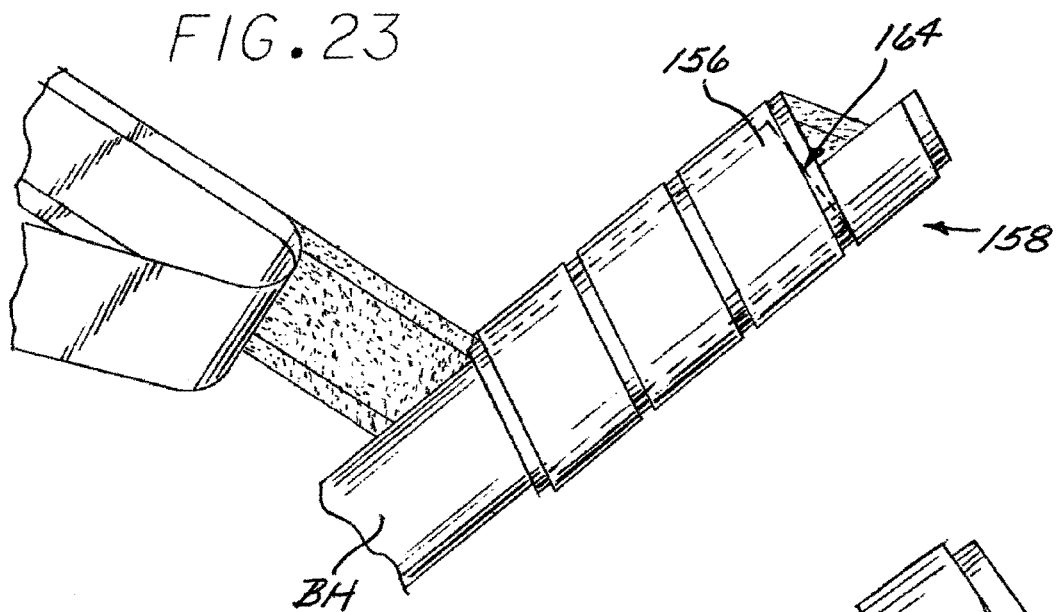
FIG.23
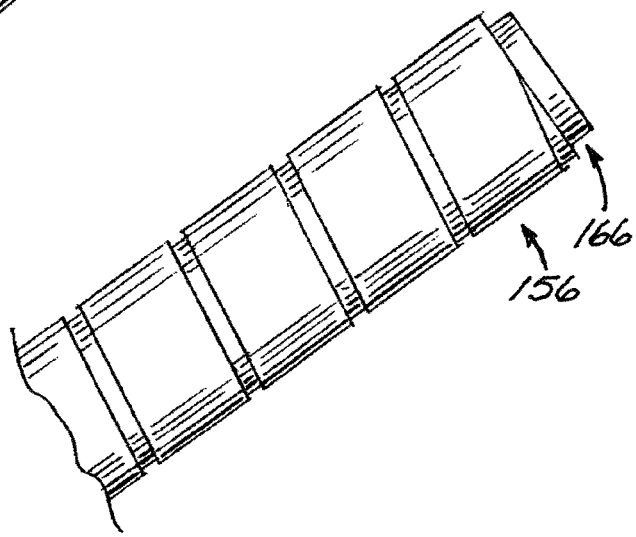
FIG.24

GRIP FOR THE HANDLE OF AN ARTICLE

PRIORITY CLAIM

The present application claims the benefit of U.S. Provisional Patent Application No. 61/173,561, filed Apr. 28, 2009 (entitled "GRIP FOR THE HANDLE OF AN ARTICLE") and U.S. Provisional Patent Application No. 61/183,478, filed Jun. 2, 2009 (entitled "GRIP FOR THE HANDLE OF AN ARTICLE"), the disclosures of each being hereby incorporated by reference in their entireties.

BACKGROUND OF THE INVENTION

1. Field of the Invention

Embodiments of the invention relate to an improved grip for use with the handle portion of articles, in particular, the handle portion of a bicycle.

2. Description of the Related Art

Though grips have been developed, there remains a need for an improved grip.

SUMMARY OF THE INVENTION

Some embodiments provide a grip that is light in weight and reduces or eliminates the absorption of water. Embodiments can be configured for use with at least a portion of the handle portion of a variety of articles including bicycles. Some embodiments include a gripping portion including an EVA inner or backing layer and a combination polyurethane and non-woven fabric. In some embodiments, the fabric layer can be impregnated with the polyurethane. In some embodiments, the fabric layer is pre-processed with a polymeric compound to enhance the elasticity of the fabric layer. In some embodiments, the polyurethane further includes a woven fabric mesh layer disposed outside the fabric layer.

Some embodiments provide a method of manufacturing a grip use with at least a portion of the handle portion of a variety of articles including bicycles. In some embodiments, the method includes dipping a thin fabric substrate into a bath of polyurethane so as to coat both sides of the fabric substrate with polyurethane, removing a substantial portion of the polyurethane from one side of the fabric substrate and smoothing the outer surface of the polyurethane on the other side of the fabric substrate. In some embodiments, the polyurethane soaks into and permeates through the fabric substrate. In some embodiments, the fabric substrate receives a polymeric treatment prior to being dipped into the polyurethane bath to enhance the elasticity of the fabric. In some embodiments, the fabric substrate is compressed prior to being dipped into the polyurethane bath. In some embodiments, the fabric substrate receives a dimpled surface pattern prior to being dipped into the polyurethane bath. The method may further include dipping the polyurethane and fabric substrate into a water bath to facilitate the coagulation of the polyurethane in and around the fabric substrate. The coagulated combination substrate of polyurethane and fabric can be squeezed, by for example, by a pair of rollers, to squeeze fluid from the coagulated polyurethane pores.

Some embodiments provide a grip configured for use with a handle portion of an article, the grip comprising a gripping member comprising an inner layer comprising ethylene vinyl acetate and an outer layer comprising polyurethane and an elastic fabric having an inner surface and an outer surface wherein the inner and outer surfaces of the elastic fabric comprise a pattern of crests and troughs. In some embodiments, a substantial portion of the crests on the inner surface are substantially free of polyurethane and the polyurethane fills the majority of the troughs on both the inner and outer surfaces of the elastic fabric and covers the majority of the crests on the outer surface of the elastic fabric. In some embodiments, the polyurethane in the troughs of the inner surface of the elastic fabric and the crests of the inner surface of the elastic fabric are joined to the inner layer.

Some embodiments provide a method of making a gripping member for use with the handle portion of an article which includes the steps of: (1) immersing a fabric sheet having an inner surface and an outer surface into liquid polyurethane such that polyurethane forms a coating over both the inner surface and the outer surface; (2) coagulating the polyurethane on and in the first fabric sheet to form an outer sheet; (3) joining the outer sheet to a sheet comprising ethylene vinyl acetate; and (4) forming a gripping member from the outer sheet joined to the ethylene vinyl acetate sheet, the gripping member defining an inner surface and an outer surface.

Some embodiments provide a grip configured for use with a handle portion of an article, wherein the grip includes a gripping member with an inner layer including ethylene vinyl acetate joined to an outer layer. The outer layer can include polyurethane and fabric, wherein polyurethane substantially covers both sides of the fabric. In some embodiments, the grip is configured for use with a bike handle.

Some embodiments provide a grip configured for use with a handle portion of an article, wherein the grip includes a gripping member with a an inner layer comprising ethylene vinyl acetate and an outer layer comprising polyurethane and an elastic fabric, the outer layer having an inner surface and an outer surface. In some embodiments, an inner and outer surface of the elastic fabric comprise a pattern of crests and troughs, the crests on the inner and outer surfaces defining an inner fabric surface plane and an outer fabric surface plane, respectively. In some embodiments, the outer surface of the outer layer and the outer fabric surface plane define a first thickness and the inner surface of the outer layer and the inner fabric surface plane define a second thickness, the first thickness being greater than the second thickness.

Some embodiments include a bicycle grip kit including instructions for use and a gripping member configured as a strip, wherein the gripping member includes an inner layer comprising ethylene vinyl acetate and an outer layer comprising polyurethane and an elastic fabric having an inner surface and an outer surface. In some embodiments, the inner and outer surfaces of the elastic fabric comprise a pattern of crests and troughs, wherein some of the crests on the inner surface are substantially free of polyurethane and the polyurethane fills the majority of the troughs on both the inner and outer surfaces of the elastic fabric and covers the majority of the crests on the outer surface of the elastic fabric. In some embodiments, the polyurethane in the troughs of the inner surface of the elastic fabric and the crests of the inner surface of the elastic fabric are joined to the inner layer.

Embodiments of the present invention include one or more advantages including offering great feel by transmitting sensitive vibrations to the hand of a user, providing shock absorption, and being light in weight and of low density. In the context of bicycle grips, the low density and extremely light weight ensures the grip remains as light as possible. For cyclists of all levels, and in particular at the more elite levels, every ounce counts when accessories are placed on a bicycle. Grips are desired that can provide shock absorption, are lightweight, and/or are readily applied to the handle.

BRIEF DESCRIPTION OF THE DRAWINGS

FIG. 1 is a perspective view of an exemplary bicycle handle incorporating a grip according to some embodiments;

FIG. 2 is a perspective view of a gripping member according to some embodiments;

FIG. 3 is a section view of the gripping member shown in FIG. 2 taken along the line 3-3 in FIG. 2;

FIG. 4 is an enlarged view of a portion of the gripping member designated by the circle 4 in FIG. 3;

FIG. 7 is a section view of a component of the gripping member shown in FIG. 2 taken along the line 7-7 in FIG. 5;

FIG. 8 is a section view of a component of the gripping member shown in FIG. 2 taken along the line 8-8 in FIG. 5;

FIG. 9 is a section view of a component of the gripping member shown in FIG. 2 taken along the line 9-9 in FIG. 5;

FIG. 10 is an enlarged view of a portion of the component shown in FIG. 8 designated by the circle 10 in FIG. 8 according to some embodiments;

FIG. 11 is an enlarged view of a portion of the component shown in FIG. 9 designated by the circle 11 in FIG. 9 according to some embodiments;

FIG. 11A is an alternative view of the portion shown in FIG. 11 according to some embodiments;

FIG. 22A is a perspective view of an exemplary bicycle handle prior to the application of a gripping member according to some embodiments;

FIG. 22B is a schematic view of instructions for use according to some embodiments;

FIG. 23 is a side view of a gripping member being spirally wrapped around a handle according to some embodiments; and FIG. 24 is a side view of the gripping member and handle combination shown in FIG. 23 after the end has been finished according to some embodiments.

Figure 5:
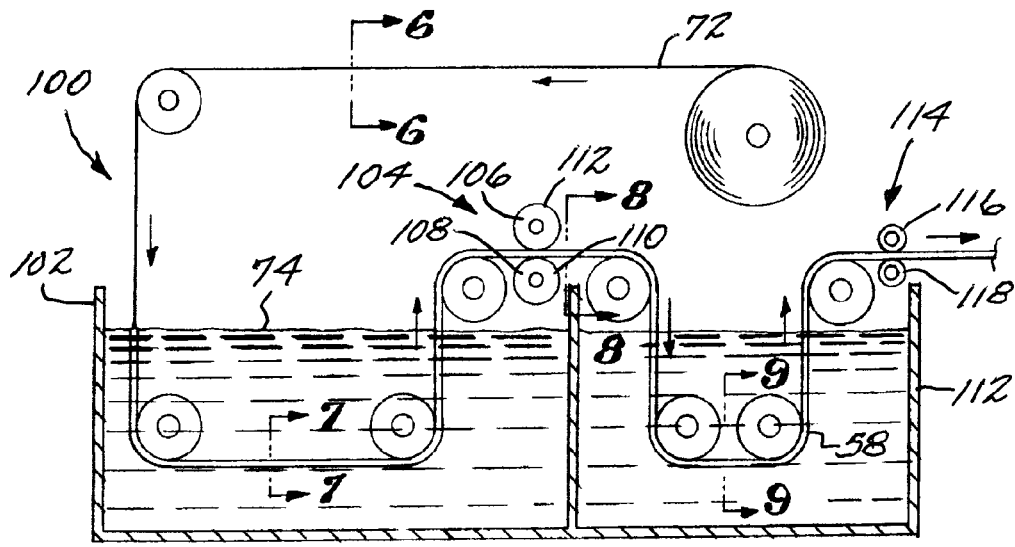
FIG. 5 is a schematic view of an apparatus for use in the manufacturing of the gripping member shown in FIG. 2 according to some embodiments.

While the invention will now be described in detail with reference to the figures, it is done so in connection with the illustrative embodiments. It is intended that changes and modifications can be made to the described embodiments without departing from the true scope and spirit of the invention.

DETAILED DESCRIPTION OF THE PREFERRED EMBODIMENT

FIG. 1 is a perspective view of a bicycle handle BH or handlebar incorporating a grip G according to some embodiments.

FIGS. 2-4 illustrate a gripping member 50 according to some embodiments. The gripping member 50 is adapted to be applied to the handle of an article, for example, a bicycle handle. Shown as a strip S, the illustrated embodiment is spirally wrapped around the handle to form a generally helical seam 52 on the surface of the gripping member 50 that corresponds to the joint between the side edges 54, 56 of the strip as described in greater detail below. Alternatively, the gripping member 50 could be formed as a panel (not shown) and provide a number of the advantages of the embodiment of FIGS. 2-4. The gripping member 50 may include a mounting sleeve or tube (not shown) around which it would be folded or wrapped. In some such embodiments, the panel would form a substantially longitudinal seam extending along the axis of the sleeve. Such an embodiment may be advantageous in some bicycle applications where the handles are short and generally straight, for example, bmx bikes or mountain bikes. To conserve weight, the tube may be made from an ethylene vinyl acetate foam, as described in greater detail below. In some embodiments, multiple strips and/or panels may be incorporated.

FIG. 3 is a section view of the gripping member 50 taken along the line 3-3 in FIG. 2. In some embodiments, the gripping member 50 preferably includes an outer layer 58 adhered, bonded, glued or otherwise attached to a base or inner layer 60. The outer layer 58 defines an inner surface 62 and an outer surface 64. Similarly, the inner layer 60 defines an inner surface 66 and an outer surface 68 (FIG. 4). In some embodiments, a spray on adhesive 70 is applied to one or both of the inner surface 62 of the outer layer 58 and/or the outer surface 68 of the inner layer 60. In some embodiments, the inner layer 60 comprises EVA to reduce the weight and lower the density of the finished grip G and to provide a cushioning material that is less inclined to absorb and hold water or other fluids. This is particularly useful in bicycle grip applications, for example when the rider sweats or rides through inclement weather, as the grip G resists absorbing water to maintain its light weight while still providing important cushioning and traction characteristics. In some embodiments, the EVA inner layer 60 is between approximately 1 and 3 millimeters thick. In some embodiments, the EVA inner layer 60 is between approximately 1.5 and 2.5 millimeters thick. In a preferred embodiment, the EVA inner layer 60 is approximately 2 millimeters thick.

FIG. 4 is an enlarged view of a portion of the gripping member 50 designated by the circle 4 in FIG. 3. As described in greater detail below, the outer layer 58 preferably includes a thin non-woven fabric layer 72 or substrate that is saturated with polyurethane 74, by, for example, dipping the thin fabric layer 72 into a polyurethane bath 102. The polyurethane 74 is then preferably coagulated to form one or more closed cells or pores 76.

The non-woven fabric layer 72 may be fabricated of suitable materials such as nylon, cotton, polyester, or the like and may be felt. In some embodiments, the non-woven fabric substrate 72 receives a polymeric treatment (polymer 75 from polymeric treatment shown in, for example, FIG. 27) prior to being dipped into the polyurethane bath 102 to enhance the elasticity of the fabric 72. In some embodiments, the fabric substrate 72 is compressed prior to being dipped into the polyurethane bath 102. In some embodiments, the fabric substrate 72 receives a dimpled surface pattern prior to being dipped into the polyurethane bath 102. The dimpled pattern facilitates the flow of polyurethane 74 into the fabric layer 72 which can reduce the amount of space available for water and other fluids to soak into and become trapped within the gripping member 50. Including a polyurethane outer layer 74 with an elastic thin felt layer 72 with dimples 84 extending partially and/or completely through the felt layer 72 enhances the flexibility of the grip while providing a tacky surface to be gripped. This is particularly useful in bicycle grip applications. In some embodiments, the thin non-woven fabric layer 72 is between approximately 0.1 and 0.5 millimeters. In some embodiments, the thin non-woven fabric layer 72 is between approximately 0.25 and 0.4 millimeters thick. In some embodiments, the thin non-woven fabric layer 72 is between approximately 0.28 and 0.32 millimeters thick. In a preferred embodiment, the thin fabric layer 72 is approximately 0.3 millimeters thick.

The use of low density EVA in the inner layer 60 permits a generally thick inner layer 60 to absorb shock and provide cushion while still maintaining a light overall grip weight. In some embodiments, the ratio of the thickness of the inner layer 60 to the thin non-woven fabric layer 72 is between approximately 3 and 15. In some embodiments, the thickness ratio is between approximately 5 and 10. In a preferred embodiment, the thickness ratio is approximately 6. In some embodiments, the ratio of the thickness of the inner layer 60 to the outer layer 58 of polyurethane 74 and fabric 72 is between approximately 2.5 and 5.5. In some embodiments, the thickness ratio is between approximately 3 and 4. In a preferred embodiment, the thickness ratio is approximately 3.5.

FIGS. 5-17 illustrate a method of manufacturing a gripping member 50 according to some embodiments. FIG. 5 is a schematic view of an apparatus 100 useful in some embodiments of the manufacturing method. Generally, in some embodiments, a thin non-woven fabric sheet 72 is dipped into a polyurethane bath 102. As used in this application, dip is intended to be a broad term meaning, for example, to immerse or submerge an object. In some embodiments, the bath 102 is a solution of polyurethane 74 (e.g., polyester, polyether) dissolved in dimethylformamide (DMF). The solids content of the polyurethane 74 will vary in accordance with the desired hardness of such polyurethane. A preferred solids content solution is approximately 28.5-30.5%, with a viscosity range of about 60,000-90,000 cps measured at 25.+−.0.5 degrees C. The viscosity of the polyurethane bath 102 can be manipulated to control the thickness of the polyurethane 74 that ultimately collects on the fabric sheet 72. The polyurethane 74 preferably coats both sides of the fabric sheet 72 and saturates through the fabric sheet 72. As discussed above, the fabric sheet 72 may be pre-dipped, saturated, or coated with a polymer treatment to enhance its elasticity. One suitable polymer is Vistamaxx Specialty Elastomer available from Exxon-Mobil Chemical Company. The Vistamaxx is a member of the Olefin Polymer family. In addition, the fabric sheet 72 may be compressed and/or receive a dimpled surface treatment. The dimples 84 can form crests 90 and troughs 92 on the outer 80 and/or inner surfaces 78 of the fabric sheet 72. In some embodiments, the dimples 84 extend partially through the fabric sheet 72. In some embodiments, the dimples 84 extend all the way through the sheet 72.

In some embodiments, the thin fabric layer 72 is coated with and/or saturated by polyurethane 74. In some embodiments, the polyurethane 74 coating the thin fabric layer 72 is between approximately 0.1 and 0.4 millimeters thick measured from the outer surface 80 of the fabric layer 72. In some embodiments, the polyurethane 74 coating the thin fabric layer 72 is between approximately 0.22 and 0.28 millimeters thick. In a preferred embodiment, the polyurethane 74 coating the thin fabric layer 72 is approximately 0.25 millimeters thick.

In some embodiments, not shown, additional liquid polyurethane can be added to the top surface of the uncoagulated polyurethane 74 that coats the thin fabric sheet 72 after the sheet 72 is directed out of the polyurethane bath 102. The second polyurethane can include one or more different characteristics from the polyurethane 74 in the bath 102 to provide contrast on the gripping member 50. For example, the second polyurethane can include a different color, durometer or level of tackiness.

In some embodiments, the fabric/polyurethane sheet is directed out of the polyurethane bath 102 and into a first processing stage 104 in which a portion of the polyurethane 74 is removed from the bottom 80 of the fabric sheet 72. In some embodiments, a majority of the polyurethane 74 is removed. In addition, the top surface 86 of the polyurethane 74 is preferably smoothed. In some embodiments, the processing stage 104 occurs in a compression system comprising a pair of rollers 106, 108. The spacing of the rollers 106, 108 can be used to help determine the thickness of the polyurethane 74 coating the fabric sheet 72. In some embodiments, the bottom roller 108 includes a rubber surface 110 or a surface comprising another similar resilient material. The bottom roller 108 preferably removes a portion of the polyurethane 74 and in some embodiments the majority of the polyurethane 74 from the bottom 80 of the fabric sheet 72. In some embodiments, the bottom roller 108 can be substituted with any other similar apparatus which strips off polyurethane 74 from the bottom 80 of the fabric sheet 72. For example, a non-rotating edge may be used. In some embodiments, the top roller 106 includes a stainless steel surface 112 or a surface comprising another similar smooth, hard surface. The top roller 106 preferably smoothes the top surface of the polyurethane 74 that coats the fabric sheet 72.

When a wet coagulation process is used, the saturated and coated fabric sheet 72 is then preferably directed into one or more water baths 120 to displace the DMF from the polyurethane 74 and to facilitate the formation of pores 76 in the polyurethane 74. From the water bath 120, the coagulated polyurethane sheet 74 is preferably directed to another processing stage 114 to press water and DMF from the coagulated polyurethane sheet 58. In some embodiments, the processing stage 114 includes one or more pairs of rollers 116, 118.

Figure 6:
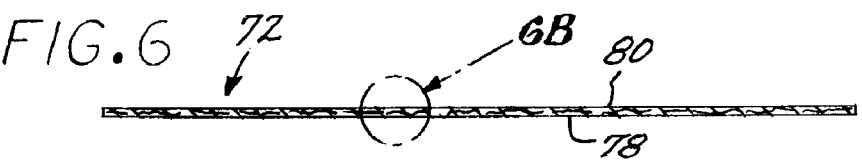
FIG. 6 is a section view of a component of the gripping member shown in FIG. 2 taken along the line 6-6 in FIG. 5.
Figure 6A:
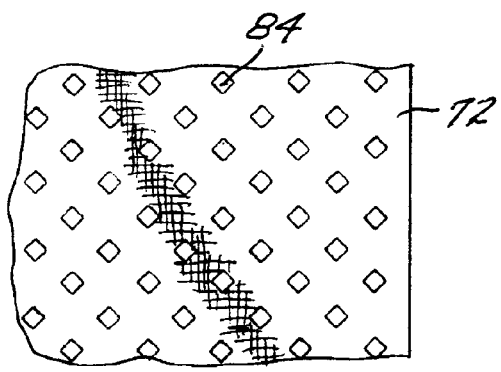
FIG. 6A is a top view of a portion of the component shown in FIG. 6 according to some embodiments.
Figure 6B:
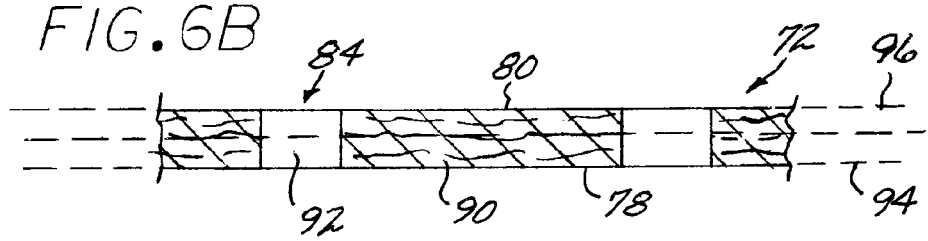
FIG. 6B is an enlarged view of a portion of the component shown in FIG. 6 designated by the circle 6B in FIG. 6 according to some embodiments.

FIG. 6 is a section view taken along the line 6-6 of the thin non-woven fabric sheet 72 before it is dipped in the polyurethane bath 102 according to some embodiments. FIG. 6A is an enlarged surface view of the thin fabric sheet 72. As described above, the non-woven sheet 72 is preferably compressed prior to being dipped. The compression process in some embodiments can create a pattern of dimples 84 or crests 90 and troughs 92 as shown in FIG. 6A. These holes 84 facilitate the saturation of polyurethane 74 into and through the fabric sheet 72 during the dipping and coagulation process. FIG. 6B is an enlarged surface view of the thin fabric sheet 72. In some embodiments, the dimples 84 extend a through the fabric sheet 72 as shown in FIG. 6B. Alternatively, in some embodiments a portion of the sheet 72 remains across the troughs 92 of the dimples 84. For example, if sheet 72 has a polymeric treatment before dipping as described above, polymer 75 may extend across the dimples 84 as shown, for example, in FIG. 27. In some embodiments, the upper or outer surface 78 of the fabric sheet 72 defines an outer surface plane 94 generally defined by the crests 90 on the outer surface 78. In some embodiments, the lower or bottom or inner surface 80 of the fabric sheet 72 defines an inner surface plane 96 generally defined by the crests 90 on the inner surface 80.

FIG. 7 is a section view taken along the line 7-7 of the thin fabric sheet 72 after it has been dipped into the polyurethane bath 102 according to some embodiments. The polyurethane 74 preferably coats both sides 78, 80 of the fabric sheet 72 and penetrates through the sheet 72. In some embodiments, the polyurethane 74 fills the crests and troughs on both sides 78, 80 of the sheet.

FIG. 8 is a section view taken along the line 8-8 of the thin fabric sheet 72 after it has been dipped into the polyurethane bath 102 and a portion of the polyurethane 74 has been stripped from the bottom side 80 according to some embodiments. FIG. 10 is an enlarged section view of the sheet 72 after the bottom 80 has been substantially stripped of polyurethane 74, and before the polyurethane 74 on top and inside is coagulated. The non-woven fabric 72 generally includes holes 84 that allow portions of the polyurethane 74 to extend from the top surface 86 of the polyurethane 74 coating the fabric to the bottom surface 80 of the saturated sheet of fabric 72. In some embodiments, the polyurethane 74 coats outer surface 78 of the fabric sheet 72 and extends between the inner 96 and outer planes 94 of the fabric sheet 72.

FIG. 9 is a section view taken along the line 9-9 of the coated and saturated sheet 58 after it has been dipped into the water bath 120 according to some embodiments. FIG. 11 is an enlarged section view of the coated and saturated sheet 58 after the polyurethane 74 is coagulated. The coagulation process generally allows the polyurethane 74 to expand and increase in thickness. In addition, pores 76 preferably form within the polyurethane 74 and enhance can enhance features of the grip G including tackiness of the gripping member 50.

In some embodiments, the polyurethane 74 coating the top or outer surface 78 of the fabric sheet 72 defines an outer surface 86. Similarly, the polyurethane 74 coating the bottom or inner surface 80 of the fabric sheet 72 defines an inner surface 88. The polyurethane 74 defines a first thickness between the outer surface 86 of the polyurethane 74 and the outer surface 78 or plane 94 of the fabric sheet 72. The polyurethane 74 defines a second thickness between the inner surface 88 of the polyurethane 74 and the inner surface 80 of the sheet 72. In some embodiments, the first thickness is substantially greater than the second thickness. In some embodiments, the first thickness is between approximately 2 and 50 times as thick as the second thickness. In some embodiments, the first thickness is between approximately 10 and 15 times as thick as the second thickness. In some embodiments, the second thickness is approximately zero.

FIG. 11A is an alternative view of the portion shown in FIG. 11 according to some embodiments. In this embodiment, an additional woven fabric mesh 82 is included in the polyurethane layer 74 during the manufacturing process. In some embodiments, the fabric mesh 82 is attached to the thin non-woven fabric layer 72 prior to dipping in the polyurethane bath 102. For example, the fabric mesh 82 can be stitched to an end of the thin fabric layer 72 and the combination dipped into a polyurethane bath 102. An example of the dipping process is described in greater detail above. The woven fabric mesh 82 generally does not absorb the polyurethane 74 during the preparation process. In some embodiments, the outer layer 58 of the gripping member 50 includes a saturated thin fabric layer 72 and an un-saturated fabric mesh layer 82. In some embodiments, the fabric mesh 82 includes longitudinally extending fibers (fibers that extend generally along the length of the long axis of a grip for a grip formed by a panel or along the long axis of a strip is the finished grip is formed from a spirally wrapped strip (FIG. 24)) and transversely extending fibers. In some embodiments, the longitudinally extending fibers will preferably be of a larger diameter than the transversely extending fibers. For example, the longitudinal fibers may have a diameter between approximately 0.4 and 0.75 millimeters and the transverse fibers may have a diameter between approximately 0.25 and 0.5 millimeters. In some embodiments, the longitudinal and transverse fibers may be of substantially equal diameters. The woven fabric mesh 82 may be fabricated of suitable materials such as nylon, cotton, polyester, or the like.

Figure 12A:
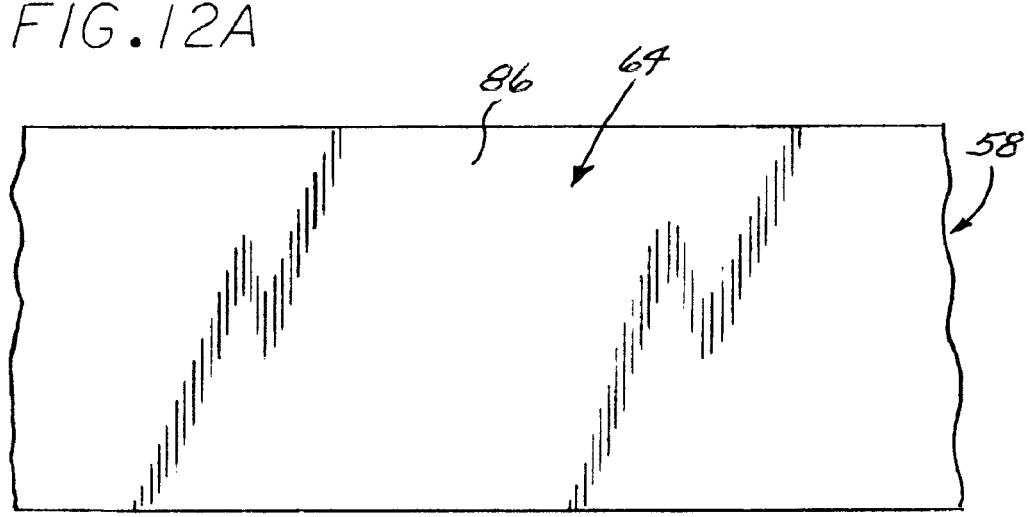
FIG. 12A is a top view of the component shown in FIG. 9.
Figure 12B:
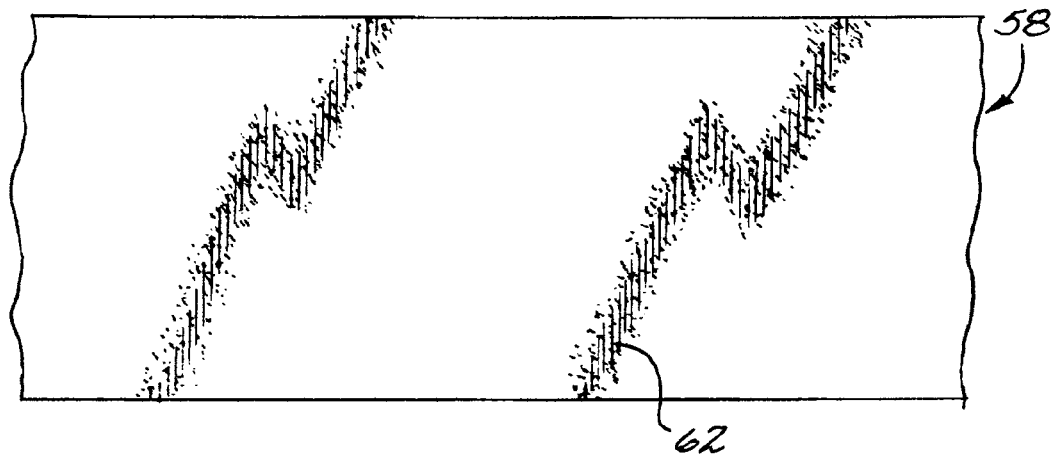
FIG. 12B is a bottom view of the component shown in FIG. 9.

FIGS. 12A and B illustrate top and bottom surface views, respectively, of the coagulated polyurethane/fabric sheet 58. FIG. 12A shows the generally smooth surface 86 of the coagulated polyurethane 74. This surface 86 can be further manipulated, such as, for example, by using a heated mold or platen to form a friction enhancing pattern thereon or to imprint logos or other indicia. In addition, the surface 86 can include printed materials as known to those of skill in the art. FIG. 12B shows the bottom surface 62 of the coagulated polyurethane/fabric sheet 58. In some embodiments, the bottom surface 62 includes both fabric fibers from the thin non-woven fabric sheet 72 as well as polyurethane 74. The bottom surface 62 is preferably rougher than the smooth top surface 64 which can facilitate bonding, adhering, or otherwise joining the polyurethane/felt sheet 58 to its EVA inner layer 60 as described in greater detail below according to some embodiments. In some embodiments, a portion of polyurethane 74 remains on the bottom or inner surface 80 of the fabric sheet 72 after the treatments described above. In some embodiments, the fabric sheet 72 is discernable through at least a portion of the polyurethane 74 remaining on the inner surface 62.

Figure 13:
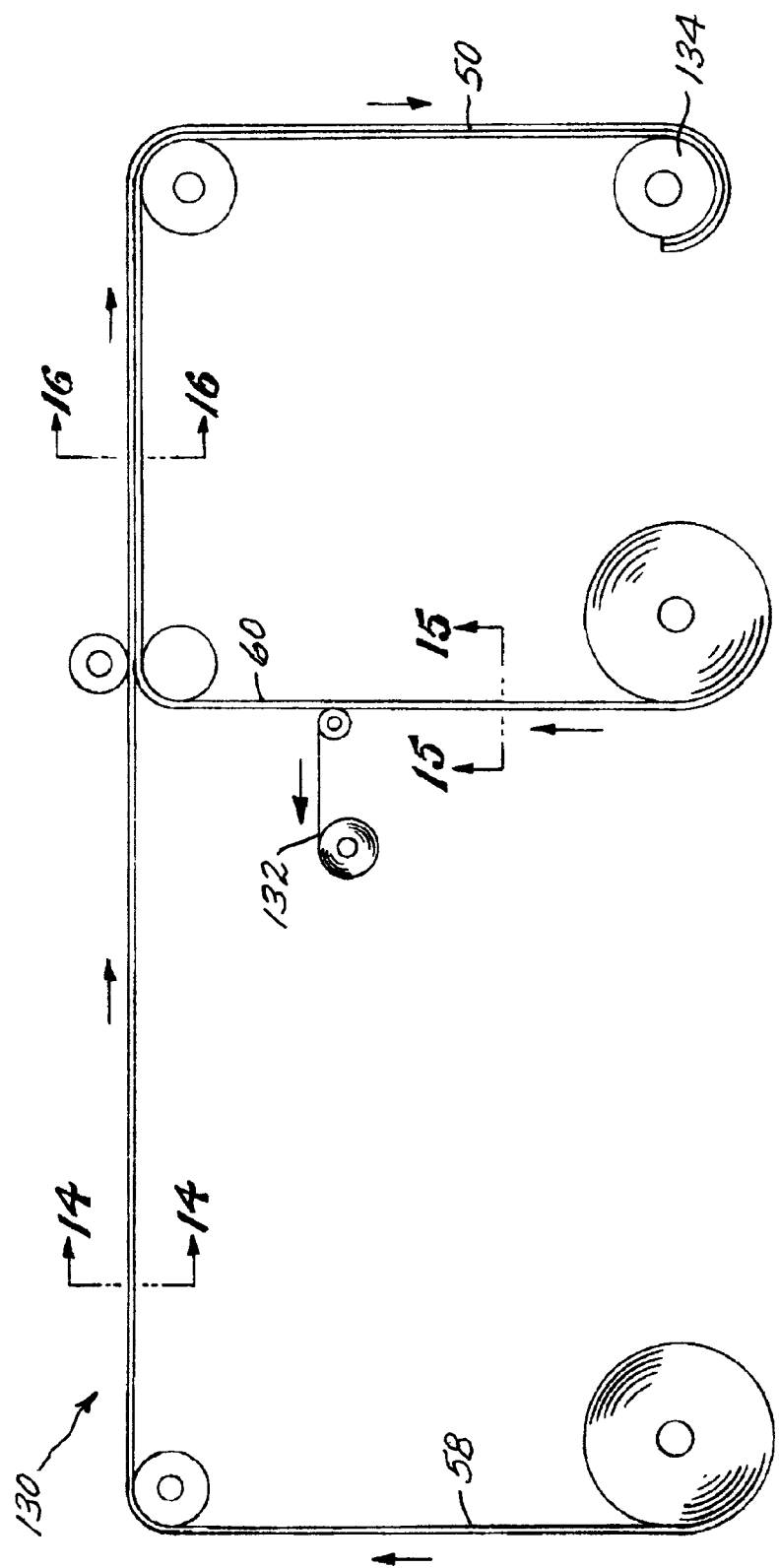
FIG. 13 is a schematic view of an apparatus for use in the manufacturing of the gripping member shown in FIG. 2 according to some embodiments.
Figure 15:
FIG. 15 is a section view of a component of the gripping member shown in FIG. 2 taken along the line 15-15 in FIG. 13.
Figure 16:
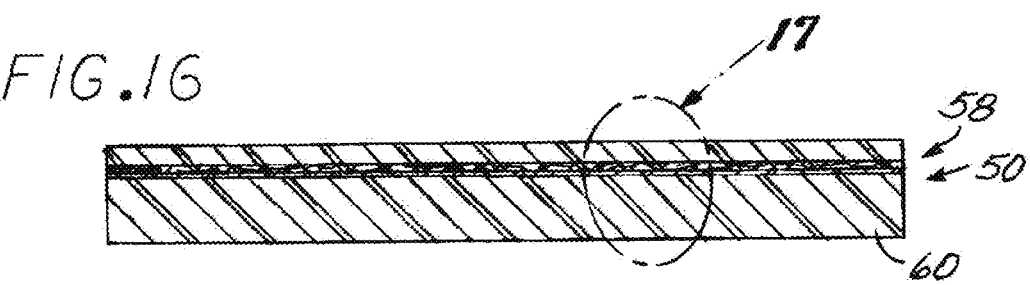
FIG. 16 is a section view of a component of the gripping member shown in FIG. 2 taken along the line 16-16 in FIG. 13.
Figure 17:
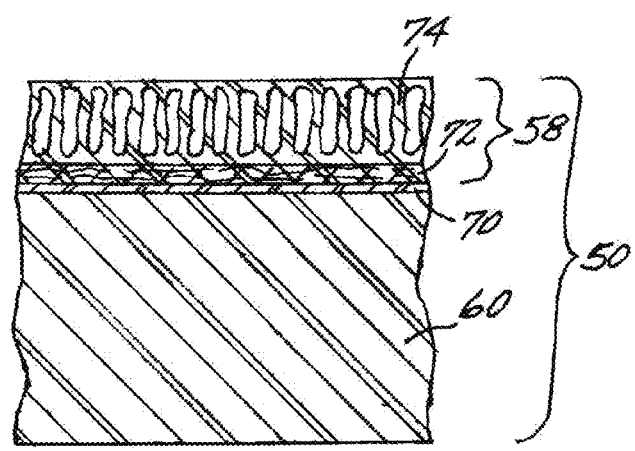
FIG. 17 is an enlarged view of a portion of the component shown in FIG. 16 designated by the circle 17 in FIG. 16 according to some embodiments.

FIG. 13 is a schematic view of an apparatus 130 useful in some embodiments of the manufacturing method. The polyurethane/felt sheet 58 described above is preferably bonded to an EVA inner or base layer 60. FIGS. 14-17 illustrate section views of the gripping member 50 during various points of the manufacturing process according to some embodiments. FIG. 15 shows a section view of the EVA inner layer 60 covered by an adhesive upper layer 70 and protective tape 132 according to some embodiments. Suitable EVA sheets are available from the Ho Ya Electric Bond Factory, Xin Xing Ind. Area. Xin Feng W. Rd., Shi Jie Town Dong Guan City, Guan Dong, Province, China. In some embodiments, the EVA sheet 60 includes an adhesive 70 that is covered with a protective sheet 132 as shown in FIG. 15. The sheet 132 is removed prior to bringing the EVA sheet 60 into contact with the bottom side 62 of the polyurethane/felt sheet 58 (see FIG. 13). Alternatively, adhesive 70 can be sprayed or otherwise applied to one or both of the bottom side of the polyurethane/felt sheet 58 and/or the EVA sheet 60. FIG. 16 shows a section view of the polyurethane/felt sheet 58 and the EVA inner layer 60 after they have been joined. The finished sheet 50 can then be wound onto to a spool 134 to wait for further processing. Alternatively, it can be directed to another location for continuous further processing.

Figure 14:
FIG. 14 is a section view of a component of the gripping member shown in FIG. 2 taken along the line 14-14 in FIG. 13.

FIG. 14 shows the polyurethane/felt sheet 58 prior to being bonded to the EVA inner layer 60. FIG. 15 shows the EVA inner layer 60 prior to being bonded to the polyurethane/felt sheet 58. FIG. 16 shows the bonded polyurethane/felt/EVA sheet 50. In some embodiments, the polyurethane/felt sheet 58 is glued to the EVA inner layer 60.

Figure 18:
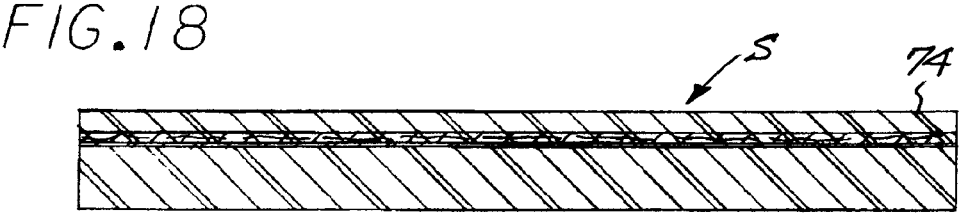
FIG. 18 is a section view of a gripping member cut as a strip from a sheet of gripping member material according to some embodiments.
Figure 19:
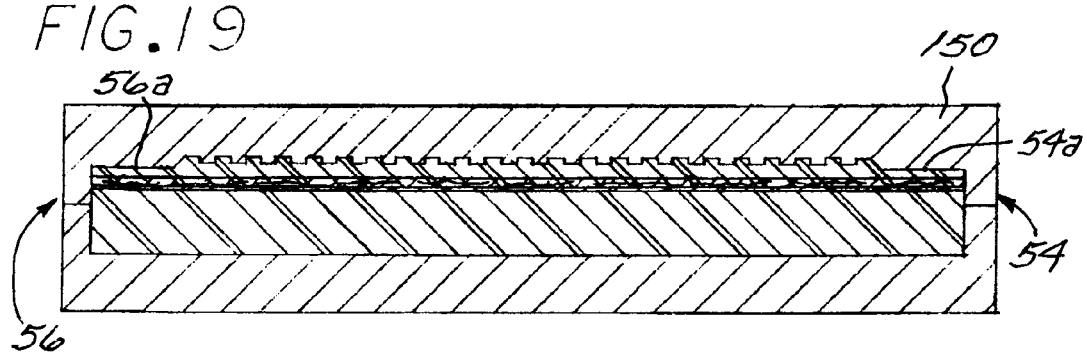
FIG. 19 is a schematic view of the gripping member shown in FIG. 18 in an apparatus for use in the manufacturing of a gripping member according to some embodiments.
Figure 20:
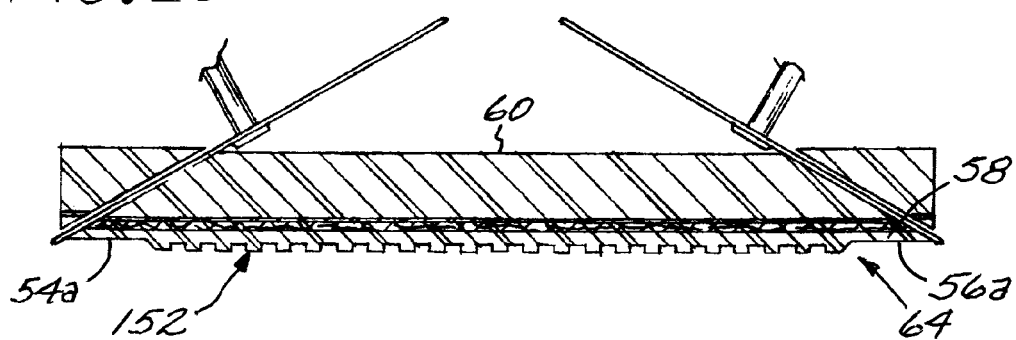
FIG. 20 is a schematic view of the gripping member shown in FIG. 18 being skived according to some embodiments.
Figure 21:
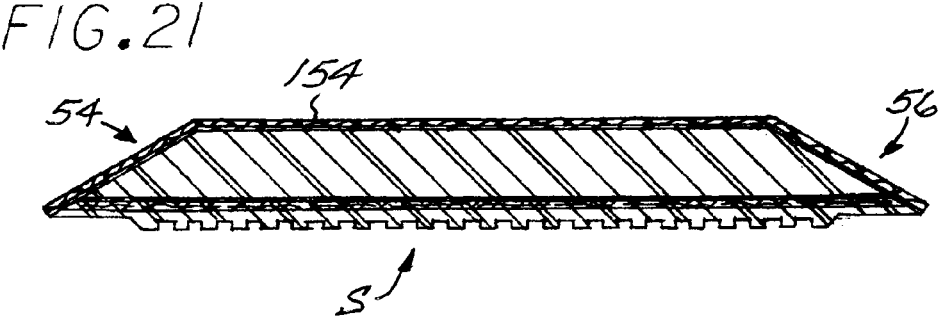
FIG. 21 is a section view of a gripping member prior to application to the handle of an article according to some embodiments.

Once formed, the polyurethane/felt/EVA sheet 50 can be cut into any suitable shape, such as the strip S shown in FIG. 2. The strip S includes first and second side edges 54, 56. FIG. 18 is a section view of a strip S cut from the sheet 50 according to some embodiments and prior to being further processed as described in greater detail below. FIG. 19 illustrates a mold 150 that can be used to form a friction enhancing pattern 152 on the top surface 64 of the polyurethane/felt/EVA strip 50. Heat compressed side edges 54a, 54b are also shown being created in the polyurethane 74 along the first and second sides 54, 56. Though shown as a separate step, the friction enhancing pattern 152 and/or compressed side edges can be created after the strip is formed from the sheet, at the same time as the strip is created, or before. FIGS. 20-21 show skiving tools that can be used to form skived edges on the strip S. In some embodiments, the first and second side edges 54, 56 can be skived through one or more layers of the strip S. In the illustrated embodiment, the skiving extends through at least a portion of all of the layers of the strip S. In some embodiments, the side edges 54, 56 are skived in an anti-parallel fashion such that, when spirally wrapped around the handle portion, one of the skived edges of the strip S overlaps and contacts the polyurethane portion 64 of the other side edge. (See FIG. 23). In some embodiments, the side edges 54, 56 are skived in a parallel fashion such that, when wrapped around the mounting surface, the edges 54, 56 overlap with like layers in contact with and glued to like layers (not shown).

FIG. 21 shows a section view of a strip according to some embodiments. The strip includes a layer of adhesive backed tape 154 substantially covering the inner surface 66 of the strip S. In some embodiments, the tape 154 only covers a portion of the bottom surface 66 of the EVA base layer 60.

FIG. 22A shows an exemplary handle BH for a bicycle. The curved radius of the handle BH is effectively covered by the flexible strip S according to some embodiments. FIG. 22B shows a schematic view of instructions for use I that can be included in a kit containing a gripping member made according to some embodiments including the illustrated embodiment.

FIGS. 23-24 show the application of a gripping member or strip S onto a bicycle handle BH according to some embodiments. The protective tape 154 can be removed from the inner surface 66 of the strip S and the strip S can be spirally wound from an end portion 156 of the handle BH toward a mid portion 158 of the handle BH. In some embodiments, the strip S is skived with anti-parallel sides 54, 56 such that a portion of the skived EVA base layer 60 of one side edge overlaps the polyurethane 64 on the other side edge during the winding process. When the winding is complete, the strip S can be secured near the mid portion with tape or other rubber or adhesive means. The excess 158 strip, shown at the first end portion 156 shown in FIG. 23, can be trimmed off with a knife or other sharp tool. Alternatively, the excess 158 can be folded into the hollow end portion 164 of the bike handle BH. As shown in FIG. 24, the end 156 of the grip G can be finished off with a cap 166. In the illustrated embodiment, the cap 166 is configured to extend into the hollow end portion 164 of the handle BH to trap at least a portion of the strip S therein.

FIGS. 25-35 are SEM images of an embodiment of a grip and various components of the grip at different stages of the manufacturing process.

Figure 25:
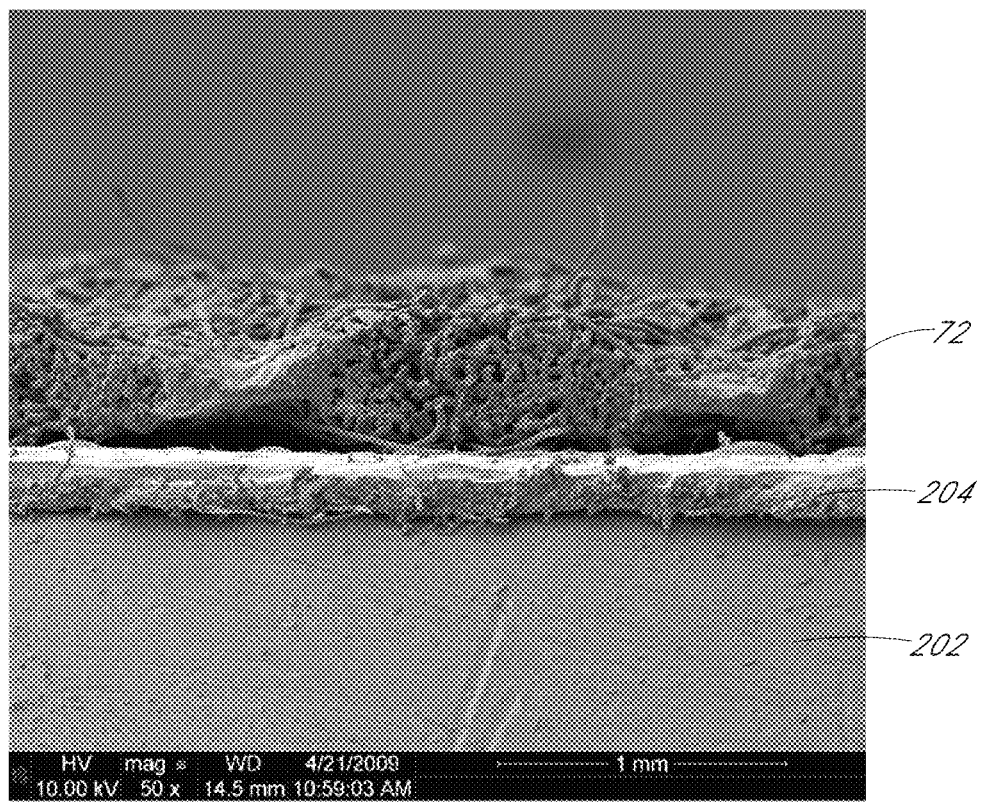
FIG. 25 is a SEM image of a cross-section of the component schematically illustrated in, for example, FIGS. 6-6B.

FIG. 25 is a SEM image of a cross-section of the thin fabric sheet 72 schematically illustrated in, for example, FIGS. 6-6B. To facilitate the imaging, the sheet 72 was attached to an SEM stub 202 (shown in the foreground/bottom of FIG. 25) with double sided carbon tape 204 (shown between the stub and component in FIG. 25). The stub 202 and the tape 204 are not illustrated in the schematics and are not part of the imaged sheet 72.

Figure 26:
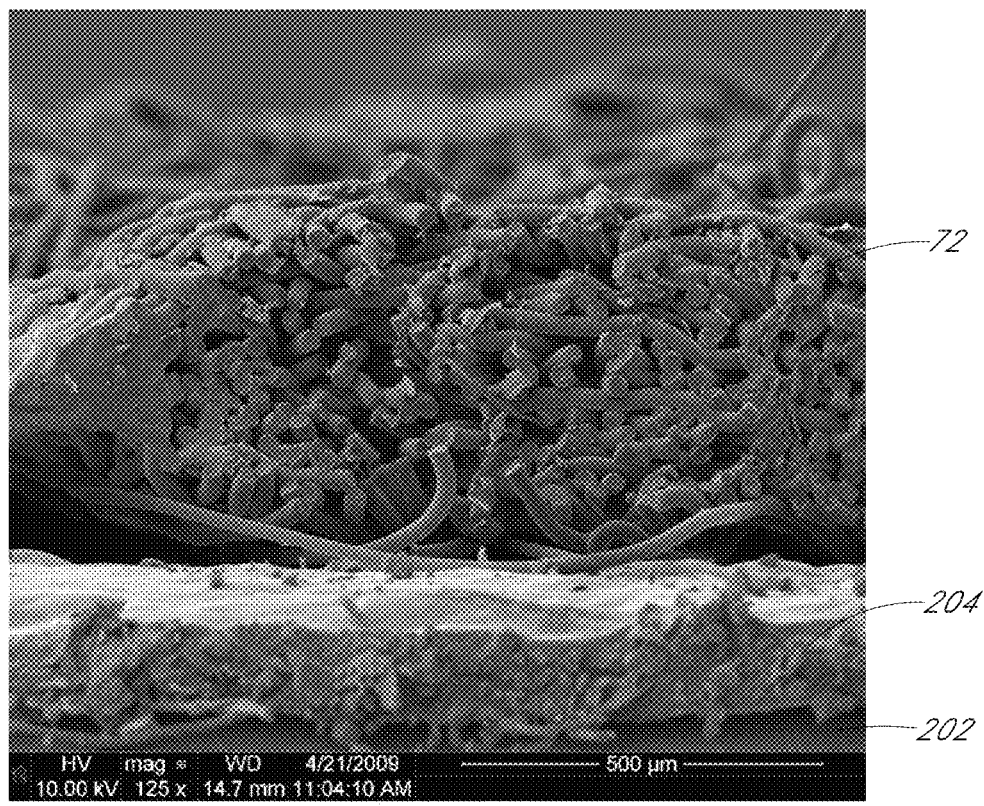
FIG. 26 is an enlarged SEM image of a portion of the cross-section shown in FIG. 25.

FIG. 26 is an enlarged SEM image of a portion of the cross-section shown in FIG. 25. The image also shows the SEM stub 202 and carbon tape 204 as described above with respect to FIG. 25.

Figure 27:
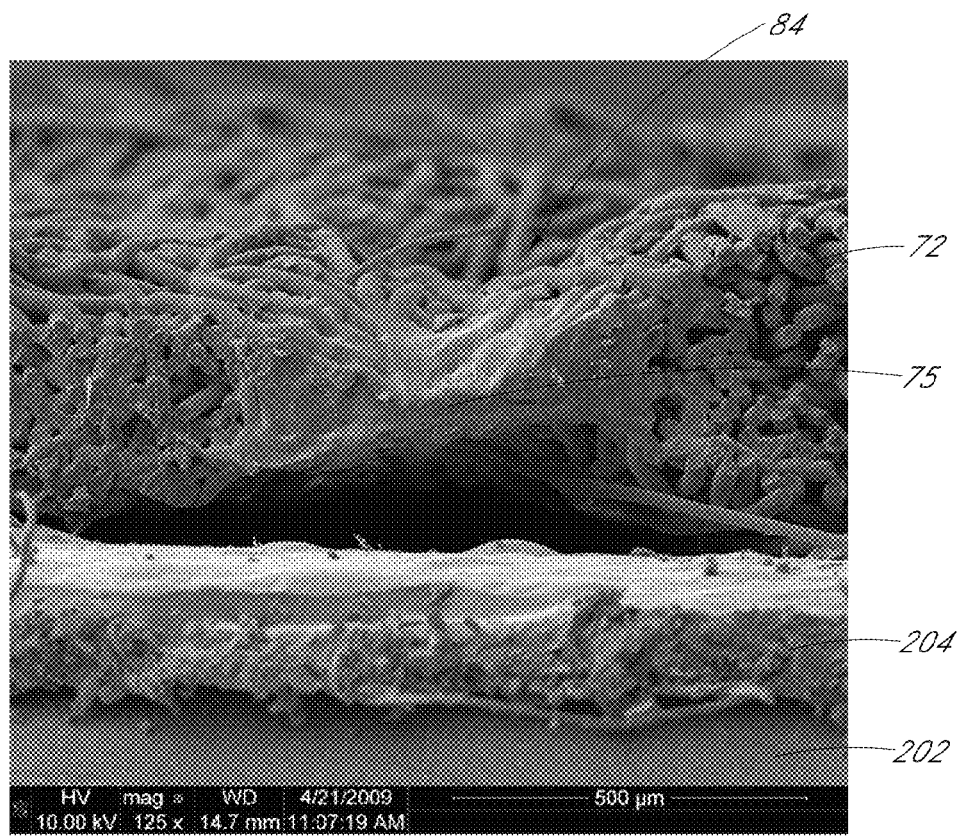
FIG. 27 is an enlarged SEM image of another portion of the cross-section shown in FIG. 25.

FIG. 27 is an enlarged SEM image of another portion of the cross-section shown in FIG. 25. The image also shows the SEM stub 202 and carbon tape 204 as described above with respect to FIG. 25. The image shows sheet 72 including a polymer 75 extending across the dimples 84 as described above.

Figure 28:
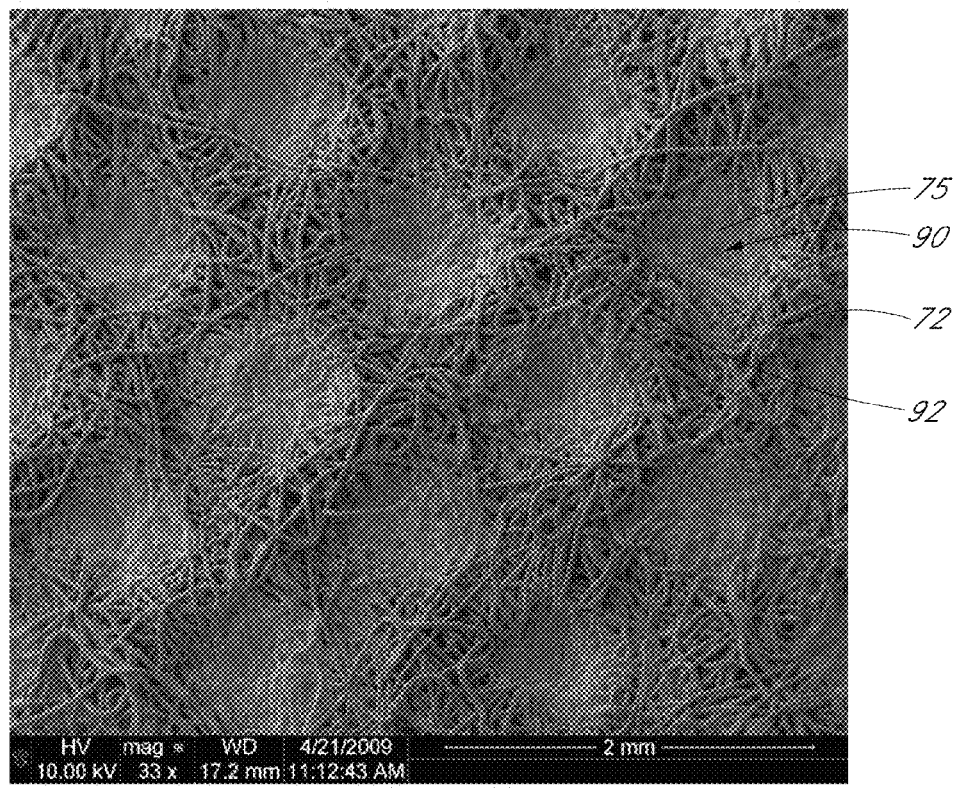
FIG. 28 is a SEM image of a surface of the component schematically illustrated in, for example, FIGS. 6-6B.

FIG. 28 is a SEM image of a surface of the sheet 72 schematically illustrated in, for example, FIGS. 6-6B.

Figure 29:
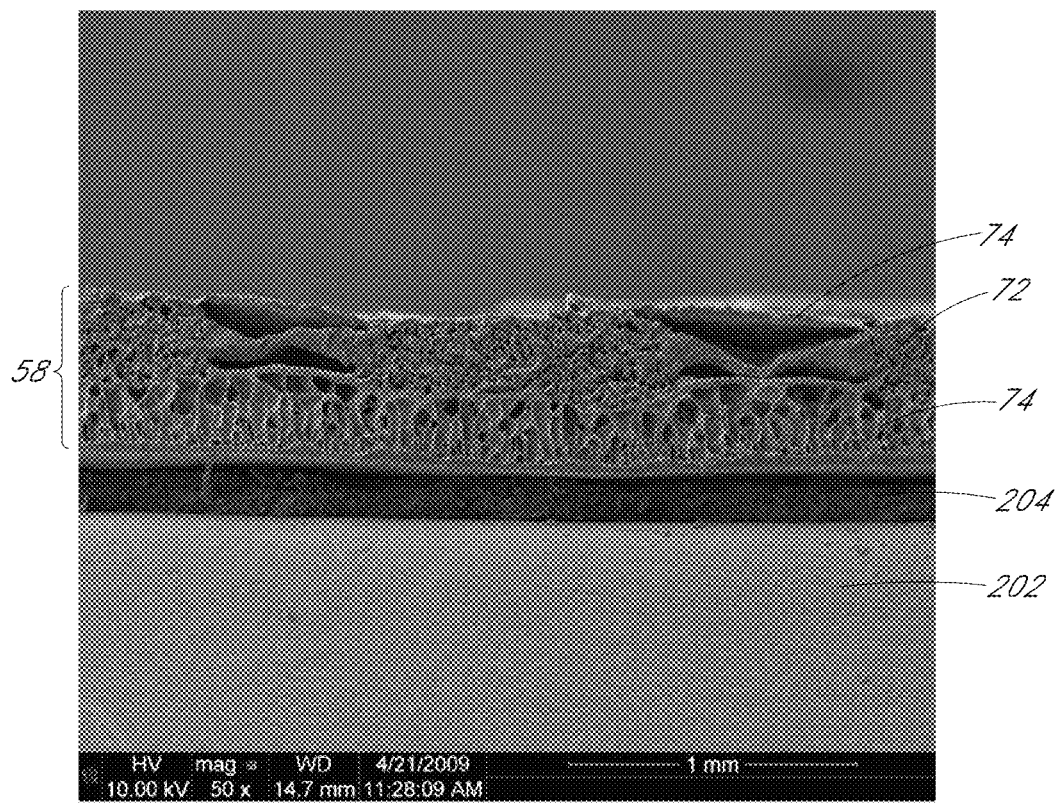
FIG. 29 is a SEM image of a cross-section of the component schematically illustrated in, for example, FIGS. 9 and 11.

FIG. 29 is a SEM image of a cross-section of the outer layer 58 schematically illustrated in, for example, FIGS. 9 and 11. The image also shows the SEM stub 202 and carbon tape 204 as described above with respect to FIG. 25. In addition, the outer layer 58 appears upside down as compared to the schematics (with the polyurethane 74 of the outer layer 58 in the illustrated embodiment attached to the stub 202 by the carbon tape 204 on the bottom of the image).

Figure 30:
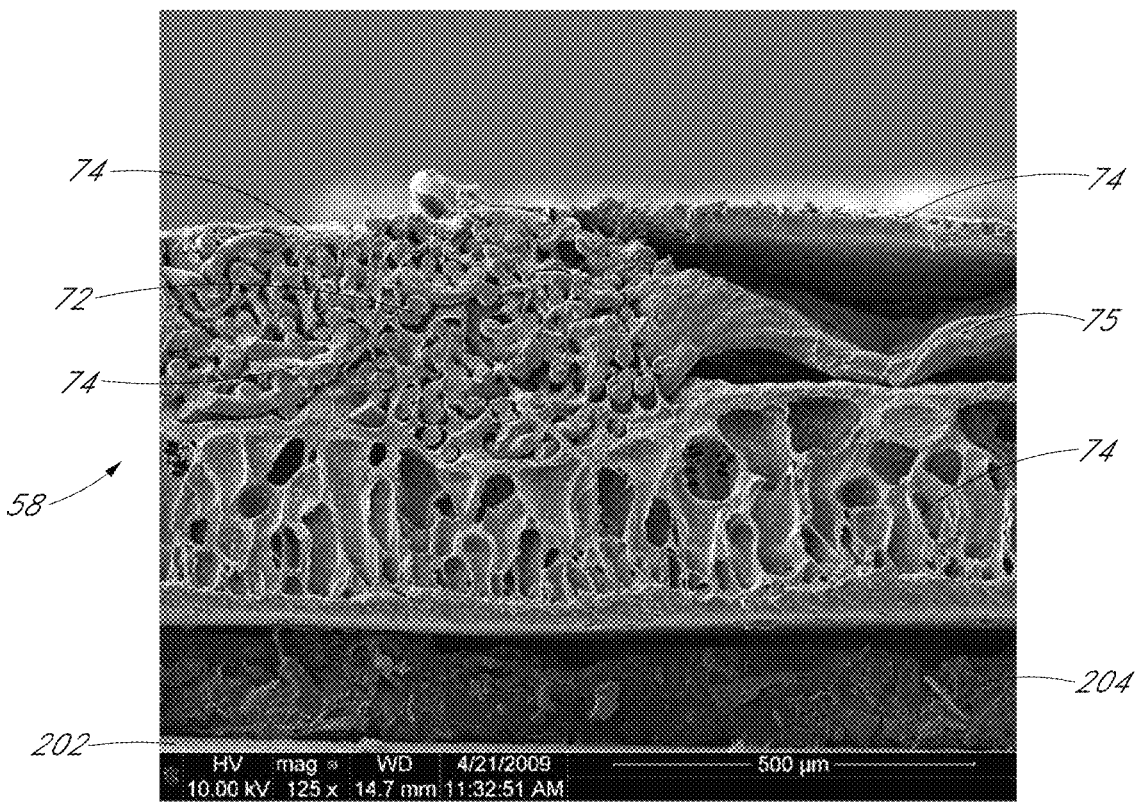
FIG. 30 is an enlarged SEM image of a portion of the cross-section shown in FIG. 29.

FIG. 30 is an enlarged SEM image of a portion of the cross-section shown in FIG. 29. The image also shows the SEM stub 202 and carbon tape 204 as described above with respect to FIG. 25. In addition, the outer layer 58 appears upside down as compared to the schematics (with the polyurethane 74 of the outer layer 58 in the illustrated embodiment attached to the stub 202 by the carbon tape 204 on the bottom of the image). Polyurethane 74 is also shown penetrating into sheet 72 as described above.

Figure 31:
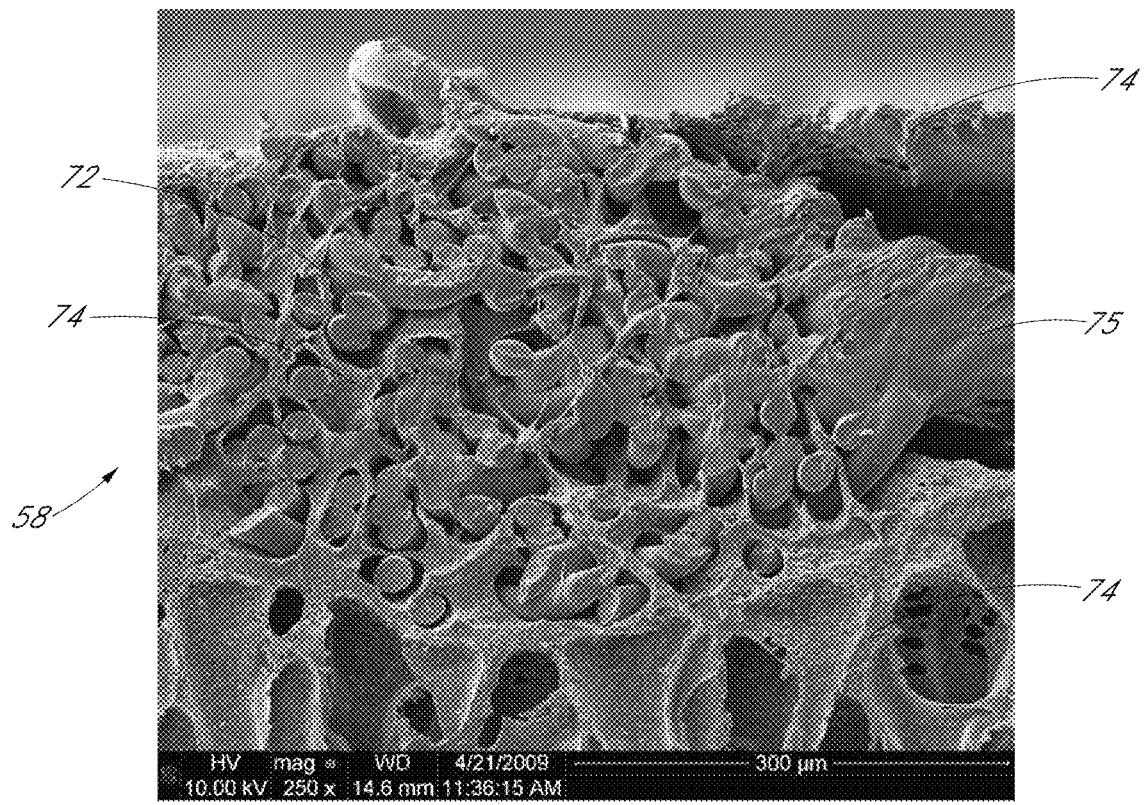
FIG. 31 is an enlarged SEM image of a portion of the enlarged cross-section shown in FIG. 30.

FIG. 31 is an enlarged SEM image of a portion of the enlarged cross-section shown in FIG. 30. The outer layer 58 appears upside down as compared to the schematics (with the polyurethane 74 of the outer layer 58 in the illustrated embodiment on the bottom). Polyurethane 74 is also shown penetrating into sheet 72 as described above.

Figure 32:
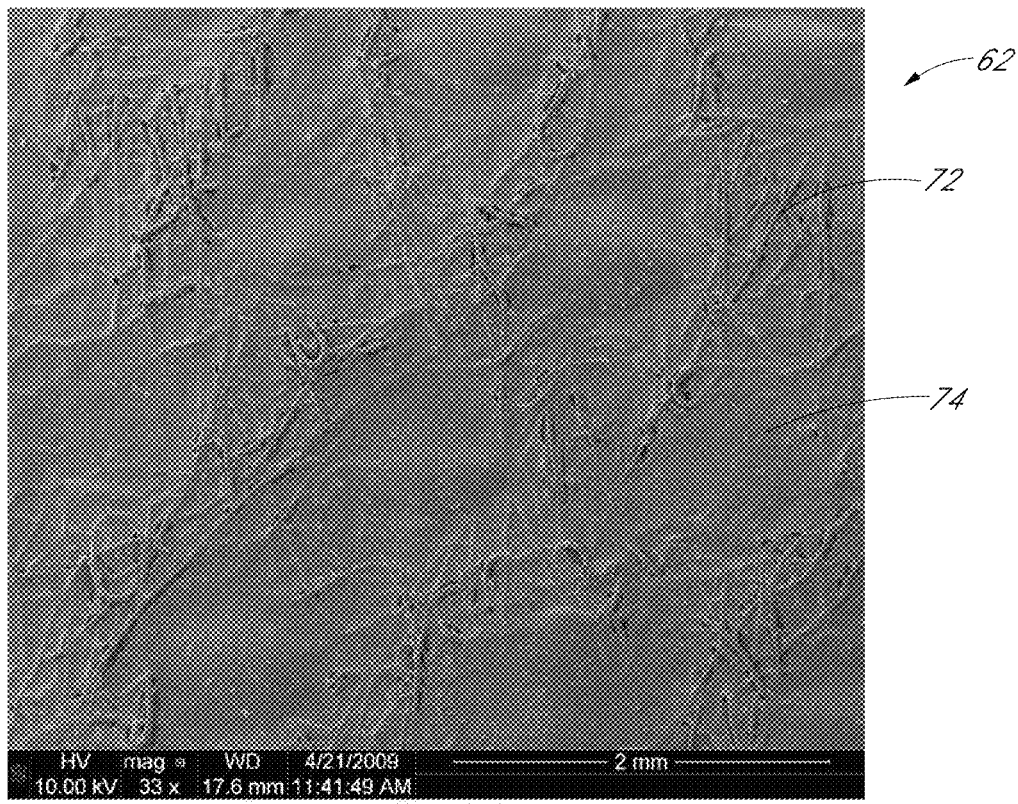
FIG. 32 is a SEM image of the bottom surface of the component schematically illustrated in, for example, FIGS. 9, 11, and 12A-B.

FIG. 32 is a SEM image of the bottom surface 62 of the outer layer 58 schematically illustrated in, for example, FIGS. 9, 11, and 12A-B.

Figure 33:
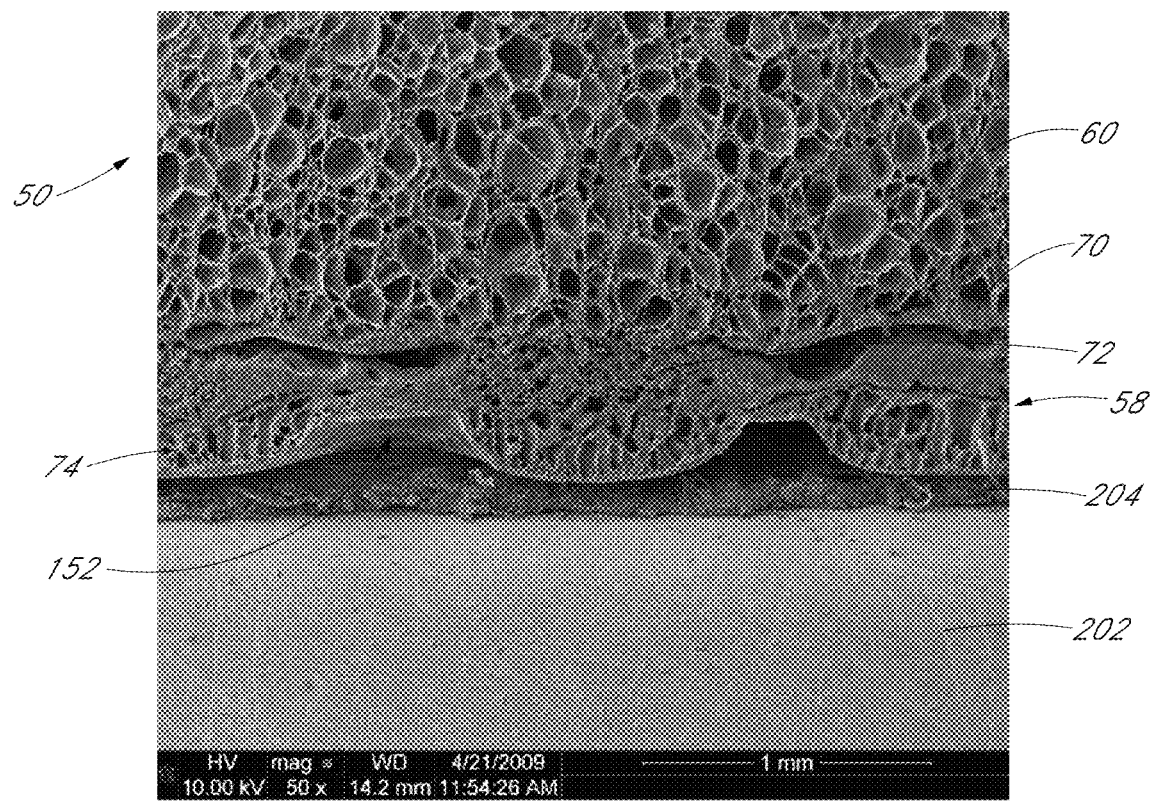
FIG. 33 is a SEM image of a portion of a cross-section of the gripping member schematically illustrated in, for example, FIGS. 19, 20, and 21.

FIG. 33 is a SEM image of a portion of a cross-section of the gripping member 50 schematically illustrated in, for example, FIGS. 19, 20, and 21. The image also shows the SEM stub 202 and carbon tape 204 as described above with respect to FIG. 25. In addition, the gripping member 50 appears upside down as compared to the schematic illustrated in FIG. 19 (with the polyurethane 74 of the outer layer 58 in the illustrated embodiment attached to the stub 202 by the carbon tape 204 on the bottom of the image).

Figure 34:
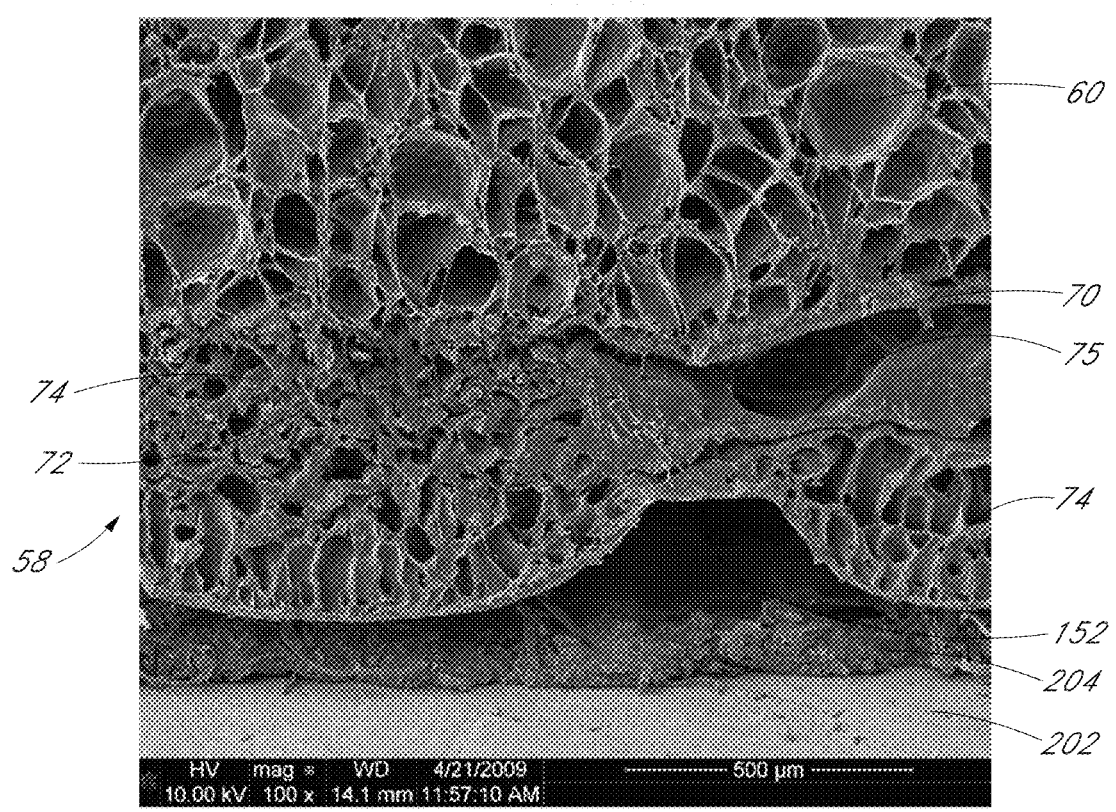
FIG. 34 is an enlarged SEM image of a portion of the cross-section shown in FIG. 33.

FIG. 34 is an enlarged SEM image of a portion of the cross-section shown in FIG. 33. The image also shows the SEM stub 202 and carbon tape 204 as described above with respect to FIG. 25. In addition, the gripping member 50 appears upside down as compared to the schematic illustrated in FIG. 19 (with the polyurethane 74 of the outer layer 58 in the illustrated embodiment attached to the stub 202 by the carbon tape 204 on the bottom of the image). Polyurethane 74 is also shown penetrating into sheet 72 as described above.

Figure 35:
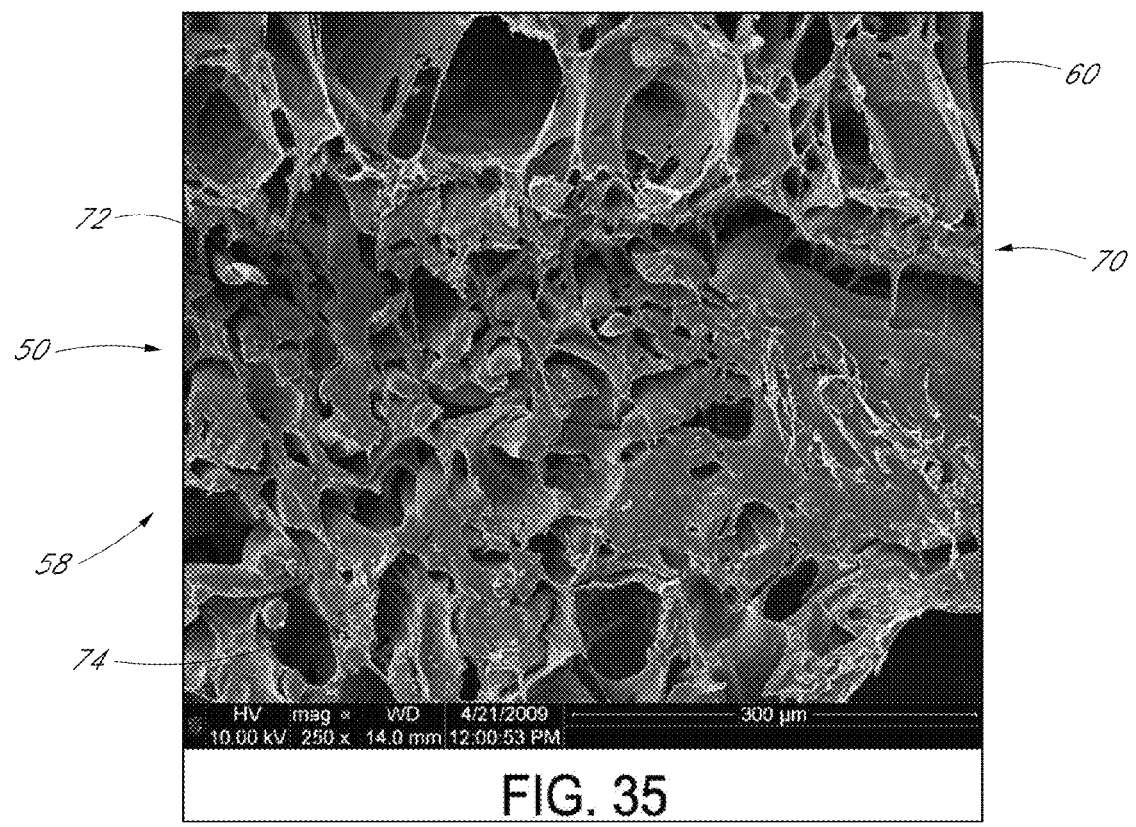
FIG. 35 is an enlarged SEM image of a portion of the cross-section shown in FIG. 34.

FIG. 35 is an enlarged SEM image of a portion of the cross-section shown in FIG. 34. The gripping member 50 appears upside down as compared to the schematic illustrated in FIG. 19 (with the polyurethane 74 of the outer layer 58 in the illustrated embodiment on the bottom). Polyurethane 74 is also shown penetrating into sheet 72 as described above.

As described above, it may be advantageous to apply the gripping member 50 to a sleeve prior to application to the handle portion of the article. In some embodiments, that sleeve can be made from EVA. According to some embodiments, an initial block of EVA is ground down into its final shape and the gripping member is applied thereto. In some embodiments, the EVA sleeve is injection molded rather than ground down from a block of EVA foam. Ethylene vinyl acetate copolymers possess many excellent characteristics such as low weight, low density, flexibility, transparency, non-toxicity and good resistance to environmental stress cracking, etc. Some embodiments of the present invention overcome the difficulties of working with injection molded EVA. For example, EVA coagulation is a relatively slow process. After injection molding a rough EVA sleeve, a core bar can be inserted inside the sleeve and the sleeve can be transferred to an appropriate mold to control the shape of the finished product. Controlling temperature and time facilitates effective control of the EVA coagulation. In some embodiments, the density of the EVA injected to form the sleeve is less than approximately 1 g/cm$^3$. In some embodiments, the density is between approximately 0.9 and 1 g/cm$^3$. In a preferred embodiment, the density is between approximately 0.930 and 0.943 g/cm$^3$. Controlling the degree of coagulation of the EVA allows embodiments of the invention to include an EVA sleeve whose volume is, for example, approximately doubled or tripled from the original volume. Therefore, in some embodiments, the density of the finished sleeve can be approximately one half or one third of the original density.

The invention has been described in terms of certain preferred embodiments. One or more aspects of each of the embodiments can be combined with one or more aspects of other embodiments and such combinations are specifically contemplated herein. Further, general modifications of the disclosure are also contemplated.

What is claimed is:

1. A grip configured for use with a handle portion of an article, the grip comprising:
a gripping member comprising
an inner layer comprising ethylene vinyl acetate and
an outer layer comprising polyurethane and an elastic non-woven fabric, the outer layer having an inner surface and an outer surface, wherein
an inner and outer surface of the elastic non-woven fabric comprise a pattern of crests and troughs, the crests on the inner and outer surfaces defining an inner fabric surface plane and an outer fabric surface plane, respectively, wherein
the polyurethane cooperates with the crests on the inner surface of the elastic non-woven fabric to define the inner surface of the outer layer such that both the polyurethane and the crests of the fabric on the inner surface of the outer layer are joined to the inner layer comprising ethylene vinyl acetate.

2. A grip as in claim 1, wherein the gripping member is configured as a strip adapted to be spirally wound around at least a portion of the handle of an article.

3. A grip as in claim 2, wherein side edges of the strip are skived so that the outer surface of the outer layer defines a first width and an inner surface of the inner layer defines a second width, the first width being larger than the second width.

4. A grip as in claim 1, wherein the gripping member further comprises a fabric mesh positioned outward from the elastic non-woven fabric and substantially covered by the polyurethane.

5. A grip as in claim 1, wherein the elastic non-woven fabric comprises olefin polymer.

6. A bicycle including a grip of claim 1.

7. A bicycle grip kit comprising:
instructions for use and
a gripping member configured as a strip, the gripping member comprising
an inner layer comprising ethylene vinyl acetate and an outer layer comprising polyurethane and an elastic non-woven fabric having an inner surface and an outer surface wherein the inner and outer surfaces of the elastic non-woven fabric comprise a pattern of crests and troughs, wherein
a substantial portion of the crests on the inner surface are substantially free of polyurethane and the polyurethane fills the majority of the troughs on both the inner and outer surfaces of the elastic non-woven fabric and covers the majority of the crests on the outer surface of the elastic non-woven fabric, wherein
the polyurethane in the troughs of the inner surface of the elastic fabric and the crests of the inner surface of the elastic fabric are joined to the inner layer.

8. A kit as in claim 7, further comprising a second gripping member configured as a strip, the second gripping member comprising
an inner layer comprising ethylene vinyl acetate and an outer layer comprising polyurethane and an elastic non-woven fabric having an inner surface and an outer surface wherein
the inner and outer surfaces of the elastic non-woven fabric comprise a pattern of crests and troughs, wherein some of the crests on the inner surface are substantially free of polyurethane and the polyurethane fills the majority of the troughs on both the inner and outer surfaces of the elastic non-woven fabric and covers the majority of the crests on the outer surface of the elastic non-woven fabric, wherein the polyurethane in the troughs of the inner surface of the elastic non-woven fabric and the crests of the inner surface of the elastic non-woven fabric are joined to the inner layer.

9. A kit as in claim 8, further comprising first and second bar plugs configured for use with the handle bar of a bicycle.

10. A kit as in claim 7, wherein the elastic non-woven fabric comprises olefin polymer.

11. A kit as in claim 8, wherein the elastic non-woven fabric of the second gripping member comprises olefin polymer.

\* \* \* \* \*